(12) United States Patent
Carner et al.

(10) Patent No.: US 10,377,468 B2
(45) Date of Patent: Aug. 13, 2019

(54) ABOVE-THE-FLOOR RUDDER AND BRAKE CONTROL SYSTEM

(71) Applicant: Mason Electric Co., Sylmar, CA (US)

(72) Inventors: Fred Carner, Thousand Oaks, CA (US); Bijan Salamat, Santa Clarita, CA (US)

(73) Assignee: Mason Electric Company, Sylmar, CA (US)

( * ) Notice: Subject to any disclaimer, the term of this patent is extended or adjusted under 35 U.S.C. 154(b) by 0 days.

(21) Appl. No.: 15/453,852

(22) Filed: Mar. 8, 2017

(65) Prior Publication Data

US 2017/0174324 A1 Jun. 22, 2017

Related U.S. Application Data

(63) Continuation of application No. 14/077,110, filed on Nov. 11, 2013, now abandoned.

(60) Provisional application No. 61/724,815, filed on Nov. 9, 2012.

(51) Int. Cl.
*B64C 13/06* (2006.01)
*B64C 13/12* (2006.01)
*B64C 13/04* (2006.01)
*B64C 13/50* (2006.01)

(52) U.S. Cl.
CPC .............. *B64C 13/06* (2013.01); *B64C 13/04* (2013.01); *B64C 13/12* (2013.01); *B64C 13/503* (2013.01)

(58) Field of Classification Search
CPC ........ B64C 13/06; B64C 13/503; B64C 13/04
USPC ......................................................... 244/235
See application file for complete search history.

(56) References Cited

U.S. PATENT DOCUMENTS

| 2,424,523 | A | * | 7/1947 | Watter | B64C 25/44 |
| | | | | | 244/235 |
| 4,470,570 | A | * | 9/1984 | Sakurai | B64C 13/04 |
| | | | | | 244/235 |
| 4,848,708 | A | * | 7/1989 | Farrell | B64C 13/06 |
| | | | | | 244/235 |
| 5,056,742 | A | * | 10/1991 | Sakurai | B64C 13/06 |
| | | | | | 244/235 |
| 5,148,152 | A | * | 9/1992 | Stueckle | G06F 3/011 |
| | | | | | 273/148 B |

(Continued)

*Primary Examiner* — Brian M O'Hara
*Assistant Examiner* — Keith L Dixon
(74) *Attorney, Agent, or Firm* — Perkins Coie LLP

(57) ABSTRACT

A modular brake and rudder control system usable in an aircraft. The modular system mounts atop the flight deck floor without penetrating through the floor when the system is operatively connected to the aircraft's fly-by-wire brake and rudder systems. Pedal assemblies extending from the housing are rotatable and longitudinally moveable relative to the housing. A brake control system fully contained in the housing is connected to the pedal assemblies and provides a signal via an electrical connector to the fly-by-wire brake system upon rotation of the pedals. A rudder control system is fully contained in the housing and is operable independent of the brake control system. The rudder control system detects longitudinal motion of the pedal assemblies and provides a signal via an electrical connector to the fly-by-wire rudder system. The housing, the electrical connectors, the pedal assemblies, the brake control system and the rudder control system define a modular component installable and removable from the cockpit as a unit.

22 Claims, 20 Drawing Sheets

(56) References Cited

U.S. PATENT DOCUMENTS

| | | | | |
|---|---|---|---|---|
| 5,725,184 A * | 3/1998 | Kang | ............... | B64C 13/06 |
| | | | | 244/235 |
| 5,878,981 A * | 3/1999 | Dewey | ............... | B64C 13/24 |
| | | | | 244/190 |
| 8,353,484 B2 * | 1/2013 | Gardner | ............... | B64C 13/04 |
| | | | | 244/235 |

* cited by examiner

ABOVE-THE-FLOOR RUDDER AND BRAKE CONTROL SYSTEM

CROSS REFERENCE TO RELATED APPLICATION

This application is a continuation of U.S. patent application Ser. No. 14/077,110, titled ABOVE-THE-FLOOR RUDDER AND BRAKE CONTROL SYSTEM, filed Nov. 11, 2013, which claims priority to and the benefit of U.S. Provisional Patent Application No. 61/724,815, titled ABOVE-THE-FLOOR RUDDER AND BRAKE CONTROL SYSTEM, filed Nov. 9, 2012, all of which are incorporated herein in their entirety by reference thereto.

TECHNICAL FIELD

Embodiments of the present disclosure are directed to flight surface controls and brake controls for aircraft.

BACKGROUND

Conventional fixed wing aircraft have a plurality of control surfaces, including the rudder, operated by mechanical links and cabling to interconnect pilot-controlled rudder pedals to the actual control surface at the aft of the aircraft. The linkages and cabling typically extend the length of the aircraft under the flight deck. These linkages and cabling can be difficult to access, maintain, and even install during initial manufacture. Conventional aircraft brake systems have similar drawbacks. Electrical fly-by-wire systems have been contemplated for aircraft flight control systems and brake systems. However, there is a need for a reliable, highly accurate fly-by-wire rudder control system and/or brake control system for use in aircraft while remaining in a compact spatial envelope.

SUMMARY

The present disclosure is directed to an above-the-floor, modular rudder and brake control system that overcomes drawbacks of the prior art and provides other benefits. At least one embodiment of the present disclosure is directed to a modular brake and rudder control system for use in an aircraft having a cockpit with a flight deck floor. The aircraft has a fly-by-wire brake system and a fly-by-wire rudder system. The modular brake and rudder control system comprises a housing with opposing side portions, and the housing is configured to mount fully above the flight deck floor without penetrating through the flight deck floor when the modular brake and rudder control system is operatively connected to the fly-by-wire brake and rudder systems. Electrical connectors are connected to the housing and are operatively connectable to the fly-by-wire brake and rudder systems. A pair of pedal assemblies are coupled to the housing and project from the side portions. Each pedal assembly has a foot pedal engageable by a pilot or other operator, and each pedal assembly is independently rotatable about an axis of rotation in response to engagement by the operator. Each pedal assembly is also longitudinally movable relative to the housing.

The modular brake and rudder control system also has a brake control system fully contained in the housing and connected to the pedal assemblies. The brake control system has a first movement sensor operatively coupled to at least a first one of the pedal assemblies and is connected to at least a first one of the electrical connectors that connects to the fly-by-wire brake system. The first movement sensor is configured to detect rotational movement of the pedal assembly and to provide a first signal through the first electrical connector to the fly-by-wire brake system for actuation of the fly-by-wire brake system as a function of range or rate of rotational movement of the pedal assembly.

The modular brake and rudder control system also has a rudder control system fully contained in the housing and operably independent of the brake control system. The rudder control system has a second movement sensor operatively coupled to the pedal assemblies independent of the first sensor and connected to a second one of the electrical connectors that connects to the fly-by-wire rudder system. The second movement sensor is configured to detect longitudinal motion of the pedal assemblies and to provide a second signal through the second electrical connector to the fly-by-wire rudder system as a function of longitudinal movement of the pedal assembly relative to the housing.

The modular brake and rudder control system also has a position adjustment system operable independent of the brake control system and the rudder control system. The position adjustment system is connected to the pedal assemblies and is adjustable to simultaneously move the pedal assemblies in the same direction to change a longitudinal position of the pedal assemblies relative to the housing between forward and aft positions.

Another embodiment provides a modular brake and rudder control system for use in a vehicle having a control center with a control deck floor and having an electronically controlled brake system and an electronically controlled rudder system. The modular brake and rudder control system comprises a housing that mounts in the control center fully above the control deck floor without penetrating through the floor when the modular brake and rudder control system is operatively connected to the brake and rudder systems. Electrical connectors are connected to the housing and are operatively connectable to the brake and rudder systems. A pair of pedal assemblies project from the housing, and each pedal assembly has a pedal engageable by an operator. Each pedal assembly is independently rotatable and longitudinally movable relative to the housing.

The modular brake and rudder control system has a brake control system fully contained in the housing and connected to the pedal assemblies. The brake control system has a first movement sensor operatively coupled to at least a first one of the pedal assemblies and connected to at least a first one of the electrical connectors that connects to the brake system. The first sensor is configured to detect first movement of the pedal assembly and to provide a first signal through the first electrical connector to the brake system for actuation of the brake system as a function of range of the first movement of the pedal assembly.

The modular brake and rudder control system has a rudder control system fully contained in the housing and operably independent of the brake control system. The rudder control system has a second movement sensor operatively coupled to the pedal assemblies and connected to a second one of the electrical connectors that connects to the rudder system. The second movement sensor is configured to detect longitudinal motion of the pedal assemblies and to provide a second signal through the second electrical connector to the rudder system as a function of longitudinal movement of the pedal assembly.

Another embodiment provides a modular brake and rudder control system for use in an aircraft having a cockpit with a flight deck floor, and having fly-by-wire brake system and a fly-by-wire rudder system. The modular brake and rudder control system comprises a housing with a frame and a cover over the frame. The frame is removably attachable atop the control deck floor without penetrating through the floor when the modular brake and rudder control system is operatively connected to the brake and rudder systems. Electrical connectors are connected to the housing and are operatively connectable to the brake and rudder systems. A pair of pedal assemblies extend from the housing, and each pedal assembly is rotatable and longitudinally moveable relative to the housing.

A brake control system is fully contained in the housing and is carried by the frame. The brake control system is connected to the pedal assemblies and to at least a first one of the electrical connectors that connects to the brake system. The brake control system detects rotational movement of the pedal assembly and provides a first signal through the first electrical connector to the brake system for actuation of the brake system. A rudder control system is fully contained in the housing and is carried by the frame. The rudder control system is connected to the pedal assemblies and is operable independent of the brake control system. The rudder control system is connected to at least a second one of the electrical connectors that connects to the rudder system. The rudder control system detects longitudinal motion of the pedal assemblies and provides a second signal through the second electrical connector to the rudder system. The housing, the electrical connectors, the pedal assemblies, the brake control system and the rudder control system define a modular component installable and removable from the cockpit as a unit.

DETAILED DESCRIPTION

Figure 1:
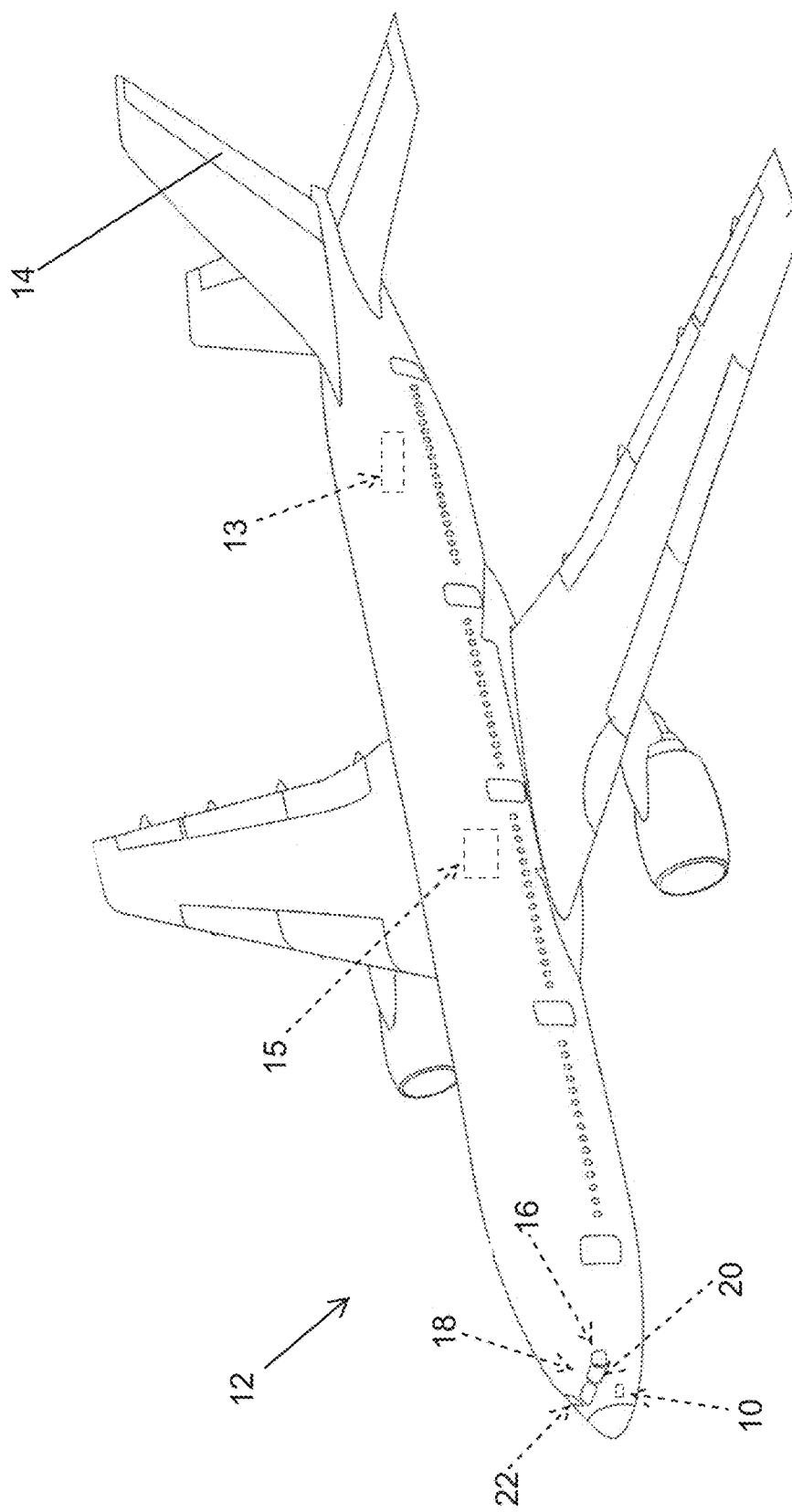
FIG. 1 is an isometric view of an aircraft having an above-the-floor brake and rudder control system in accordance with one or more embodiments of the present disclosure.

A brake and rudder control system for use with an aircraft having fly-by-wire control systems in accordance with embodiments of the present disclosure is shown in the drawings for purposes of illustration. Several specific details of the embodiments are set forth in the following description and the Figures to provide a thorough understanding of certain embodiments of the disclosure. One skilled in the art, however, will understand that the present invention may have additional embodiments, and that other embodiments may be practiced without several of the specific features described below.

FIG. 1 schematically illustrates an aircraft 12 having a fly-by-wire rudder control system 13 operatively connected to a rudder 14. The aircraft 12 also has a fly-by-wire brake control system 15 operatively connected to aircraft brakes. The aircraft 12 has an above-the-floor, modular, fly-by-wire brake and rudder control assembly 10 that electrically interfaces with and provides control signals to control the rudder control system 13 and the brake control system 15. The modular brake and rudder control assembly 10 is mounted atop the flight deck floor 16 in the aircraft cockpit 18 in a position for operative engagement by a pilot controlling the aircraft 12. In the illustrated embodiment, the aircraft's cockpit 18 includes a captain station 20 and a first officer station 22, each of which includes a brake and rudder control assembly 10 for use by the respective pilot to help control the aircraft.

Figure 2:
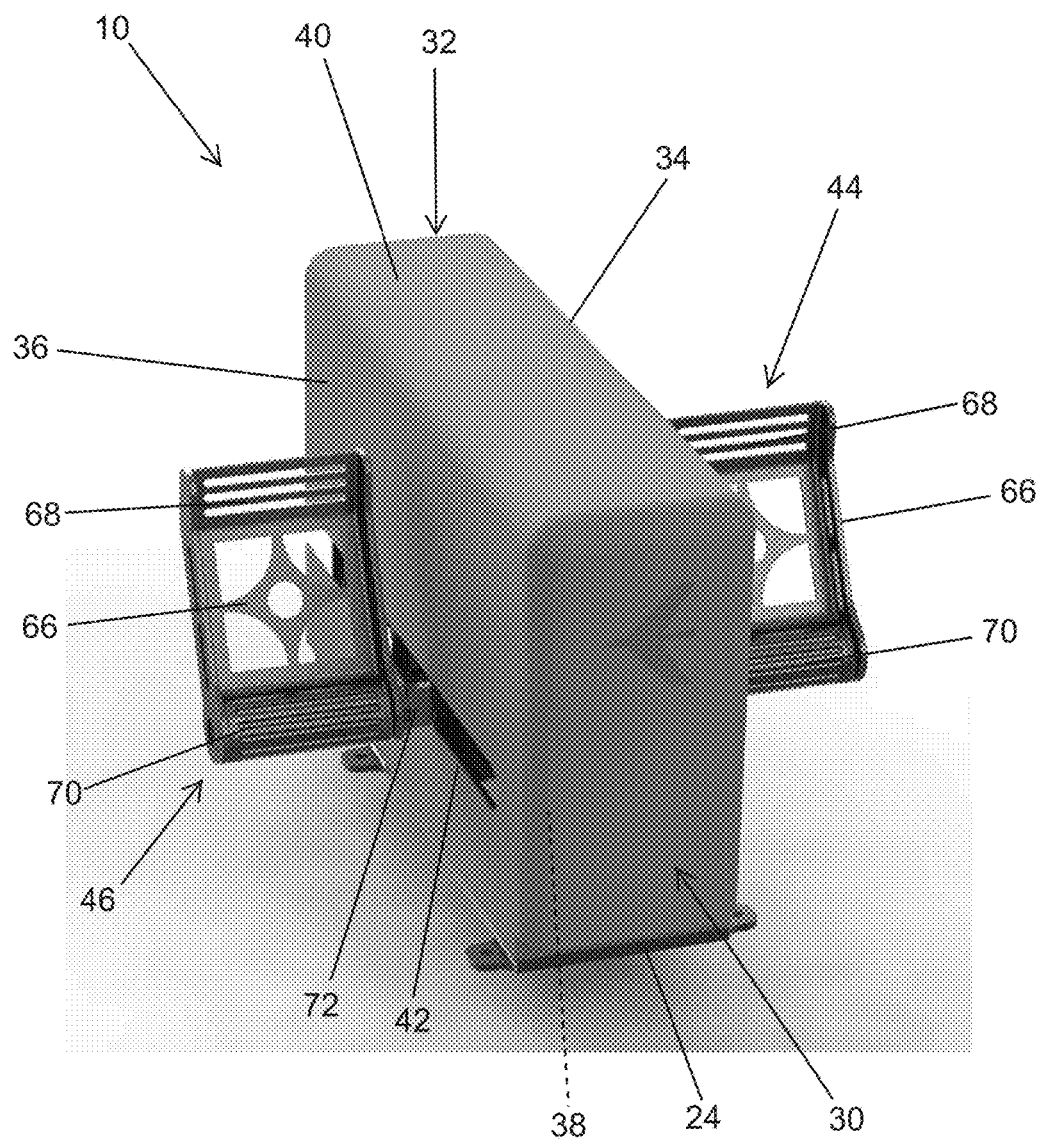
FIG. 2 is an aft isometric view of an above-the-floor brake and rudder control assembly of the system of FIG. 1 in accordance with one or more embodiments of the present disclosure.

As seen in FIG. 2, the brake and rudder control assembly 10 is a self-contained, modular unit having a base plate 24 affixed to the top surface 26 of the flight deck floor 16 without having to penetrate through the flight deck. This above-the-floor, modular brake and rudder control system 10 includes a plurality of electrical connectors 28 on the forward surface that operatively connects to the aircraft's fly-by-wire rudder control system, brake control system, and steering system. This modular construction without having to penetrate through the flight deck allows for easy and quick installation, maintenance, and replacement while maintaining a compact envelope to minimize space requirements within the cockpit 18 (FIG. 1).

The rudder and brake control assembly 10 is described herein in relation to a fore/aft, inboard/outboard frame of reference, as would be a typical orientation in the cockpit 18 of the aircraft 12. It is to be understood that the rudder and brake control assembly 10 may or may not have other orientations relative to a selected mounting surface. Further, the modular rudder and brake control assembly 10 illustrated in the figures is discussed below relative to the captain station 20 in the aircraft 12. The modular rudder and brake control assembly 10 is, however, interchangeable between the captain station 20 and the first officer station 22.

Figure 3:
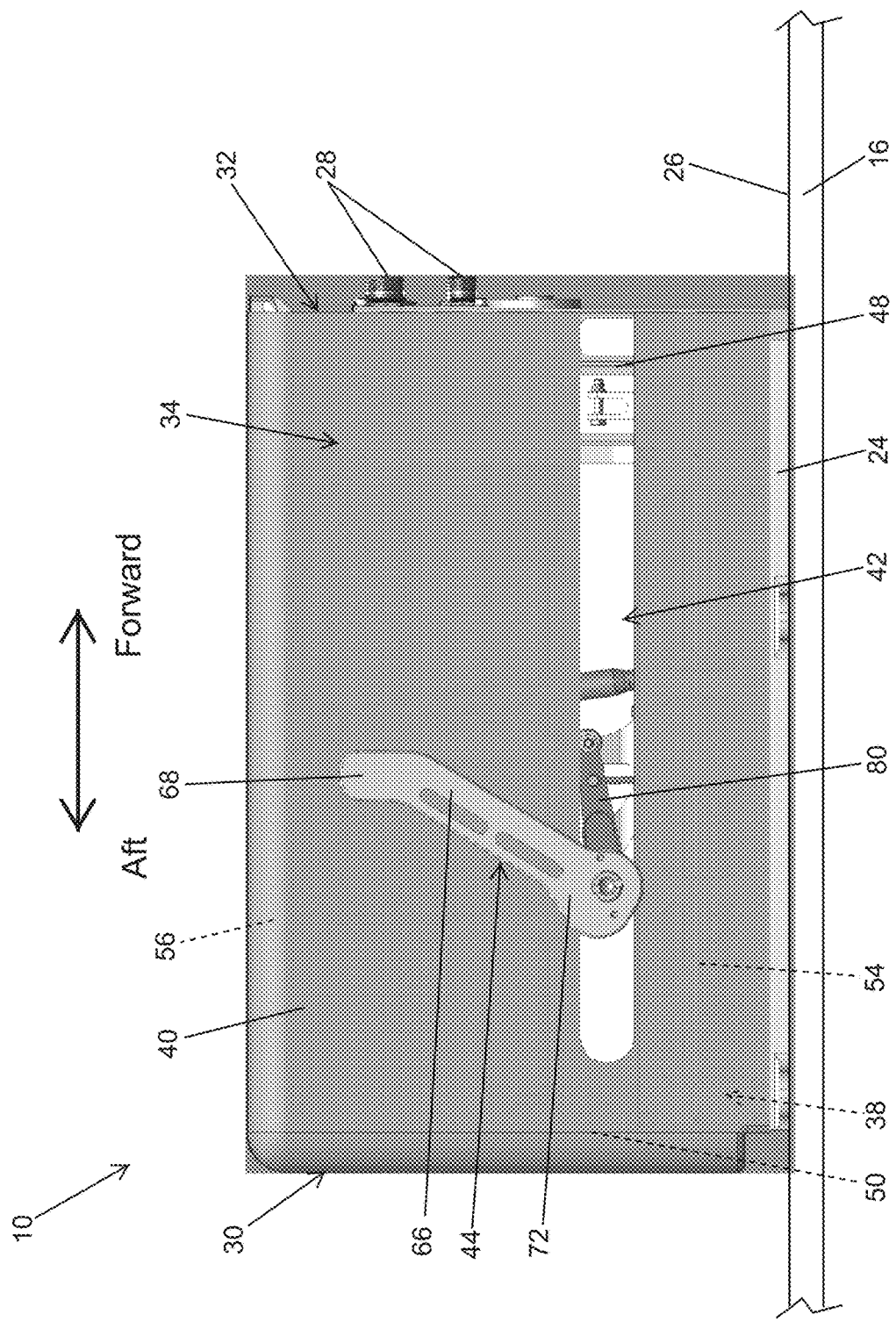
FIG. 3 is a side elevation view of the brake and rudder control assembly of FIG. 2.

Referring to FIGS. 2 and 3, the rudder and brake control assembly 10 has an aft portion 30, a forward portion 32, an inboard portion 34, and an outboard portion 36 relative to the captain station on the port side of the aircraft's centerline. The rudder and brake control assembly 10 has an internal frame 38 that includes the base plate 24 and that supports a removable cover 40. Each sidewall 42 of the cover 40 includes an elongated pedal slot 42 oriented substantially parallel to the flight deck floor 16 on which the base plate 24 mounts. A portion of an inboard pedal assembly 44 projects through the slot 42 on the cover's inboard sidewall of the cover 40, and a portion of an outboard pedal assembly 46 projects through the slot 42 on the cover's outboard sidewall. The slots 42 are shaped and sized to accommodate horizontal movement of the pedal assemblies 44 and 46 relative to the flight deck floor 16 during operation of a rudder control assembly and during position adjustment of the pedal assemblies 44 and 46, as discussed in greater detail below.

Figure 4:
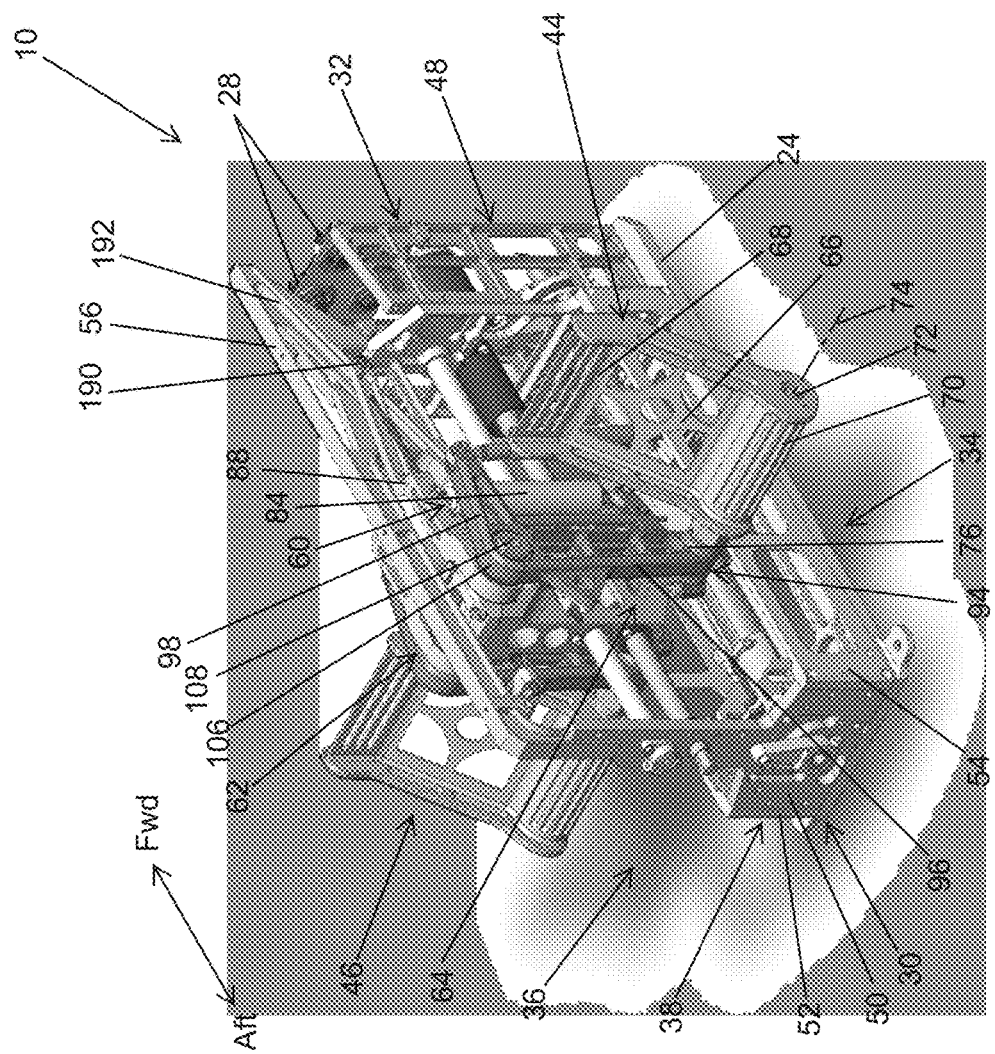
FIG. 4 is an aft isometric view of the brake and rudder control assembly of FIG. 2 with the cover removed for purposes of illustration.
Figure 5:
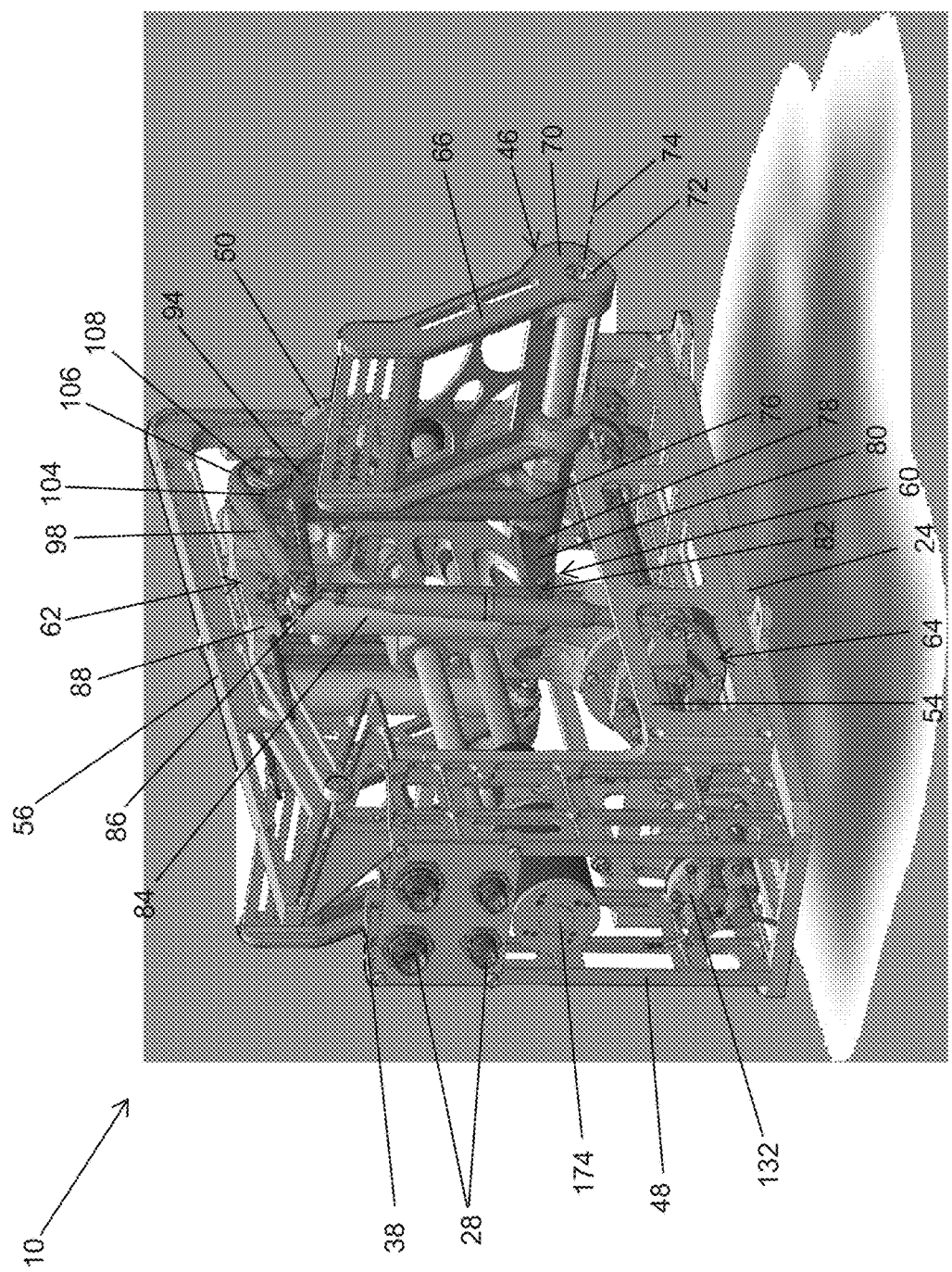
FIG. 5 is a front isometric view of the brake and rudder control assembly of FIG. 2 with the cover not shown for purposes of clarity.
Figure 6:
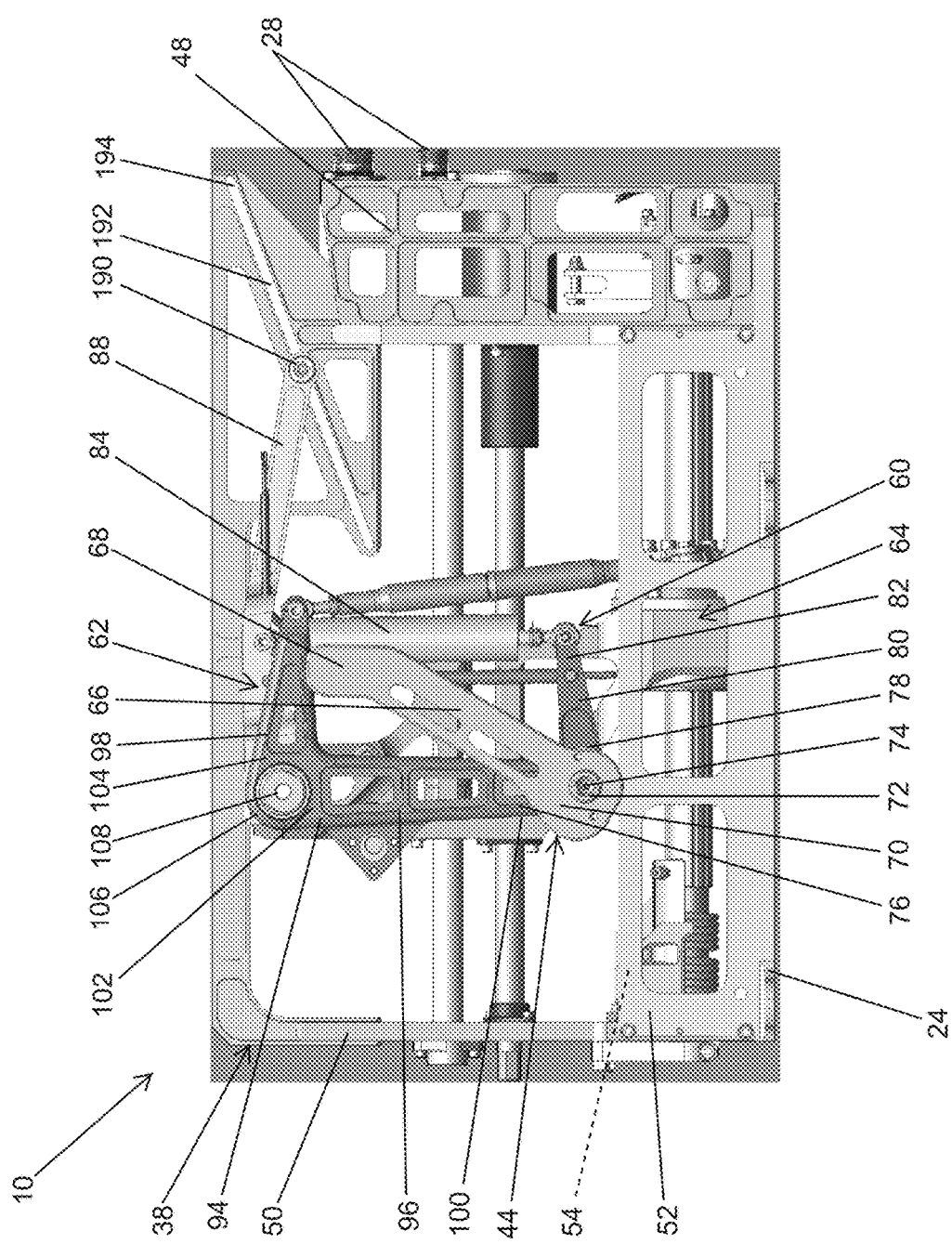
FIG. 6 is a side elevation view of the brake and rudder control assembly of FIG. 3 with the cover not shown for purposes of illustration.

FIGS. 4 and 5 are isometric views of the rudder and brake control assembly 10 with the cover 40 removed from the internal frame 38 to show the internal components of the system. The frame 38 has the base plate 24 connected to the forward and aft frame portions 48 and 50 and to inboard and outboard side panels 52 and 54 that span between forward and aft portions 48 and 50. The frame 38 also has an upper frame member 56 substantially aligned with the frame's longitudinal centerline and connected to the forward and aft frame portions 48 and 50.

The rudder and brake control assembly 10 has three independent systems operatively interconnected to the frame 38. The three systems include a brake control assembly 60, a rudder control assembly 62, and a pedal adjustment assembly 64, each of which are controlled and operated independent of the other assemblies. The three systems interface with the pilot via the inboard and outboard pedal assemblies 44 and 46. Each pedal assembly has a foot pedal 66 exterior of the frame 38 and the cover 40 (FIG. 2) and positioned for engagement by the pilot's foot. The foot pedal 66 has an upper forefoot portion 68 and a lower heel portion 70. A pedal attachment shaft 72 is securely fixed to the lower heel portion 70 and extends through the horizontal slot 42 (FIG. 3) in the cover's sidewall toward an interior area of the frame 38. The pedal attachment shaft 72 has a longitudinal axis 74 substantially perpendicular to the centerline of the frame 38, and the pedal attachment shaft is fixed to the foot pedal 66, such that the foot pedal 66 and the attachment shaft 72 can rotate as a unit about the shaft's longitudinal axis 74. This pedal assembly arrangement provides the input structure that allows the pilot to control the aircraft's brake system.

The Brake Control System

The brake control assembly 60 is configured so that the pilot can push on the forefoot portion 68 of the inboard and/or outboard foot pedal 66 to cause activation of the aircraft's brake system. The brake control assembly 60 is identical for each of the inboard and outboard pedal assemblies 44 and 46, so only one will be described. The pedal assembly's attachment shaft 72 extends horizontally away from the foot pedal 66, through a bottom end 76 of a crank member 94, and is fixedly attached to an aft end 78 of a brake lever 80. The brake lever 80 projects forwardly away from the attachment shaft 72 and terminates at a forward end portion 82. The brake lever 80 is rigidly attached to the attachment shaft 72, such that the foot pedal 66, the attachment shaft 72 and the brake lever 80 all pivot as a unit about the shaft's longitudinal axis 74.

The forward end portion 82 of the brake lever 80 is attached to a brake sensor mechanism that detects pivotal motion of the foot pedal 66. In the illustrated embodiment, the brake sensor mechanism is a Linear Variable Differential Transformer ("LVDT") 84 attached at its bottom end to the forward end of the brake lever 80. The LVDT 84 is electrically coupled to at least one of the electrical connectors 28 carried at the forward portion 48 of the frame 38, thereby providing a connection to the aircraft's fly-by-wire brake system. The upper end 86 of the LVDT 84 is securely attached to an upper linkage member 88 that remains in a fixed position when the pilot pushes on the foot pedal to activate the aircraft's brake system. The LVDT 84 is configured to detect the range and rate of motion of the brake lever 80 upon rotation of the foot pedal 66 about the longitudinal axis 74 and to generate a brake control signal as a function of the range and/or rate of movement of the brake lever 80.

When the pilot pushes on the forefoot portion 68 of either foot pedal 66, the pedal and its associated brake lever 80 rotate about the attachment shaft's longitudinal axis 74. This rotation pulls downwardly on the bottom of the LVDT 84 to extend the LVDT 84 relative to the upper linkage member 88, causing the LVDT 84 to generate and send a signal for activation of the aircraft's brake control system 15 via one or more of the connectors 28. In the illustrated embodiment, the LVDT 84 provides selected resistance to foot pedal rotation during application of the brakes to provide a brake feel force and a breakout force detectable by the pilot's foot while applying the brakes. For example, the LVDT 84 may use redundant springs to provide the feel for the pilot as he or she pushes against the foot pedal 66 to apply the aircraft brakes.

Although the illustrated embodiment utilizes a LVDT 84 to detect a pilot's brake input command, other embodiments may use other sensor mechanisms to detect movement of the brake lever 80 and to provide the brake input signal to the aircraft's brake system via the connectors 28. Each of the inboard and outboard pedal assemblies 44 and 46 are connected to independent brake systems that can each be activated by the pilot, individually or together, to provide the brake control signal to the aircraft's brake system 15 (FIG. 1).

Figures 7, 8:
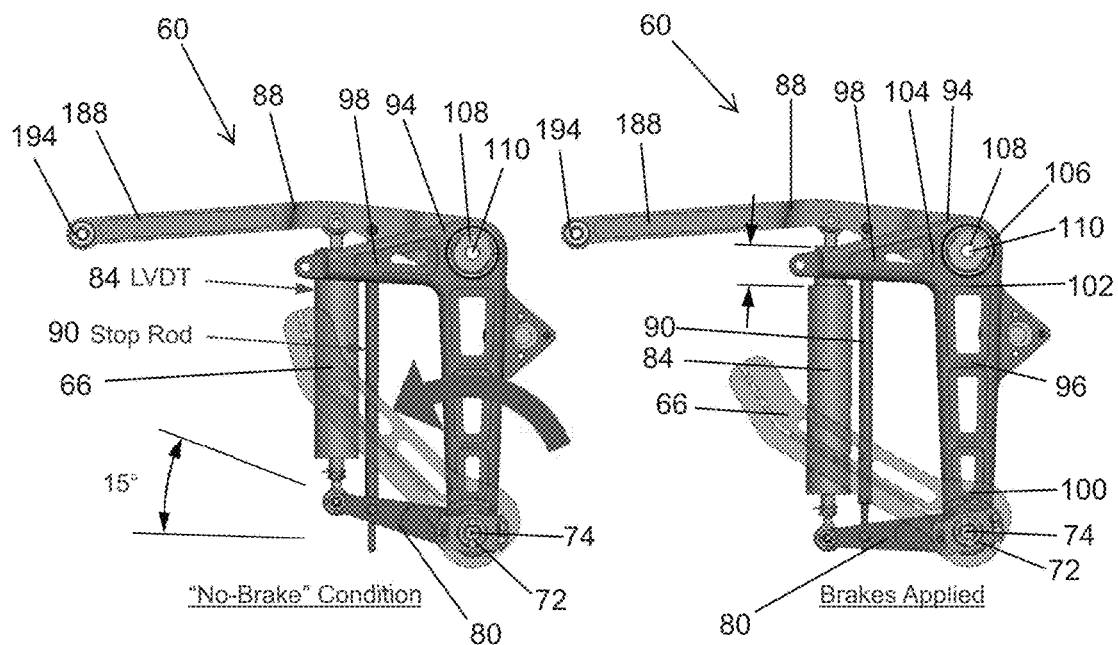
FIG. 7 is a schematic illustration of at least portions of a brake control assembly shown removed from the rudder and brake control assembly of FIG. 6, wherein the brake control assembly is in a "No-Brake" condition.
FIG. 8 is a schematic illustration of the brake control assembly of FIG. 7 shown in a "Brakes Applied" condition.
Figure 9:
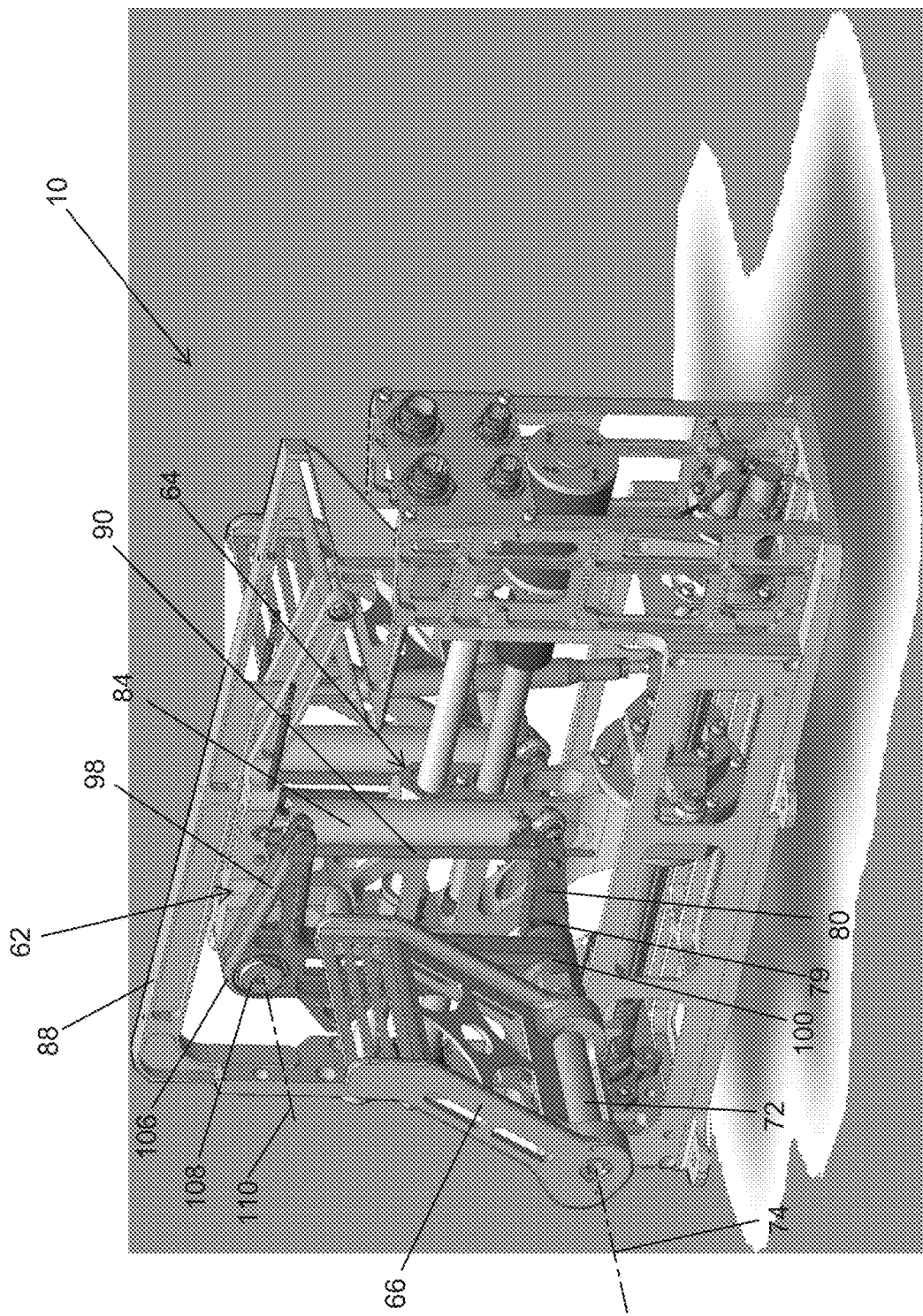
FIG. 9 is a front isometric view of the brake and rudder control assembly of FIG. 4 with portions of a rudder control assembly not shown to avoid obscuring aspects of the brake control assembly.

FIGS. 7 and 8 are illustrations of portions of the brake control assembly 60 shown removed from the frame 38 and other components of the brake and rudder control assembly 10 to avoid obscuring features of the brake control assembly 60. FIG. 9 is a partial front isometric view of the brake and rudder control assembly 10 with portions of the rudder control assembly 62 not shown for purposes of discussion and to avoid obscuring features of the brake control assembly 60. As seen in the figures, the brake control assembly 60 includes a stop rod 90 connected to the brake lever 80 forward of the pedal attachment shaft 72. The upper end of the stop rod 90 is fixed to the upper linkage member 88. The stop rod 90 is configured to allow the brake lever 80 to pivot through a brake stroke having selected range of movement between a "no-brake" position (FIG. 7) and a "full-brake" position (FIG. 8). In the illustrated embodiment, the stop rod 90 allows the brake lever 80 to rotate through a range of approximately 0°-15°, inclusive, about the attachment shaft's longitudinal axis 74.

In the illustrated embodiment, this range of rotational movement of the brake lever 80 corresponds to approximately 1.0 inches of axial travel of the LVDT 84 upon rotation of the foot pedal 66 between the "no-brake" position and the "full-brake" position. In other embodiments, the inboard and outboard pedal assemblies 44 and 46 may be configured to provide a different brake stroke with between the "no-brake" and the "full-brake" positions. For example, a shorter or longer brake lever 80 may be used to provide a different range of motion of the foot pedal for activation of the brakes. Such a variation in brake stroke length may be based upon pilot preference and/or other operational or ergonomic factors. The brake control assembly 60 can also include biasing members coupled to the LVDT 84 or other brake component that urges the foot pedals to the "no-brake" position.

The Rudder Control System

The rudder control assembly 62 operates independently of the brake control assembly 60, such that the pilot can provide rudder control input via the foot pedals 66 independent of activation of the brake control assembly 60. The rudder control assembly 62 can also be activated simultaneously with the brake control assembly 60 as needed.

Figure 10:
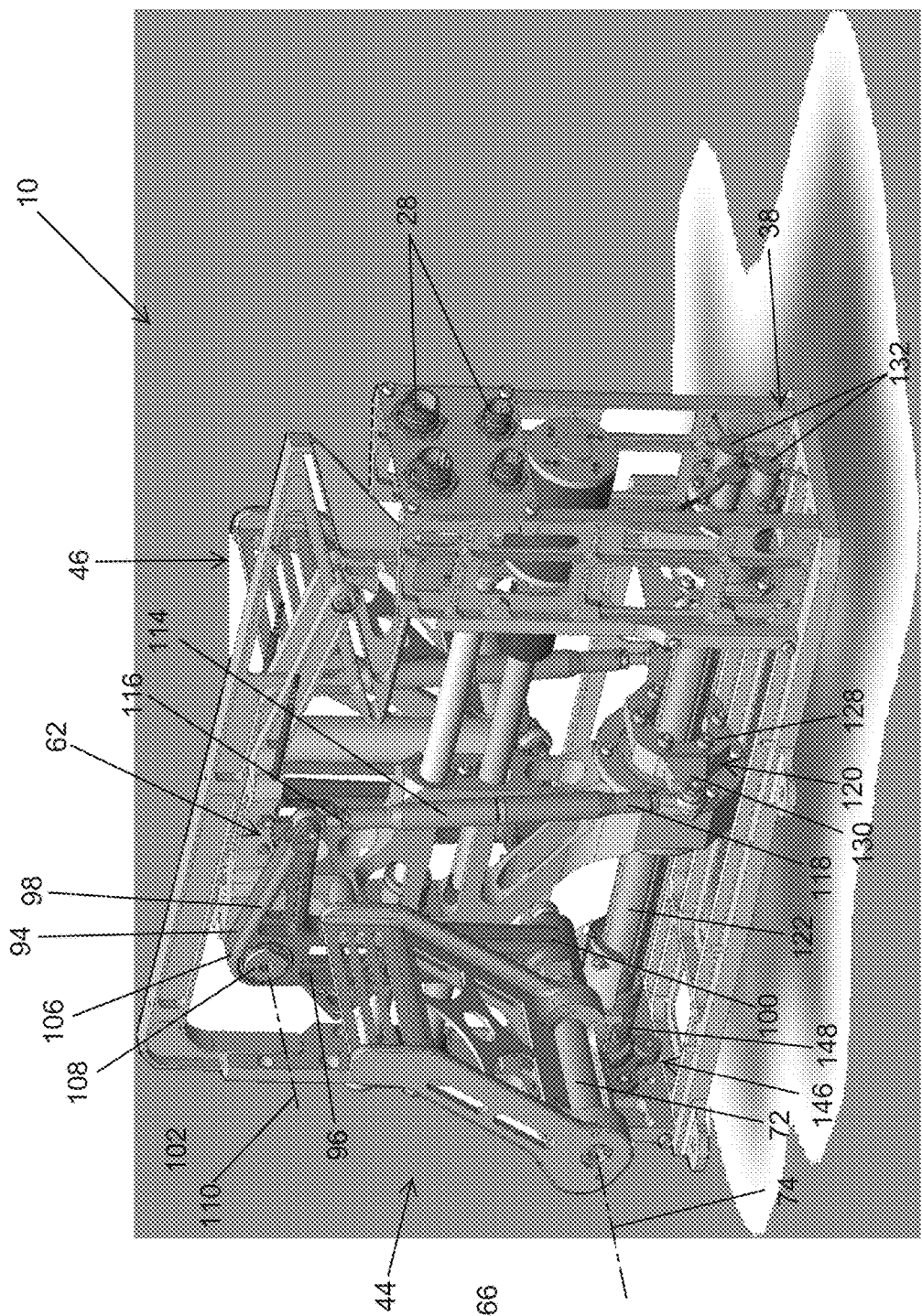
FIG. 10 is a front isometric view of the brake and rudder control assembly of FIG. 4 with portions of the brake control assembly not shown to avoid obscuring aspects of the rudder control assembly.

FIG. 10 is a partial front isometric view of the brake and rudder control assembly 10 with portions of one brake control assembly 60 not shown (e.g., the brake lever 80, LVDT 84, and stop rod 90) for purposes of discussion and to avoid obscuring features of the rudder control assembly 62. The rudder control assembly 62 includes a substantially identical configuration for each of the inboard and outboard pedal assemblies 44 and 46 so only one is described in detail herein. As seen in the figures, each pedal assembly 44 and 46 is connected to an inverted L-shaped crank member 94 having a generally vertical leg 96 and generally horizontal leg 98. The vertical leg 96 is pivotally connected at its lower end 100 to the pedal attachment shaft 72 between the foot pedal 66 and the brake lever 80 (FIG. 10). The vertical leg's upper end 102 intersects and is integrally connected to the aft end 104 of the horizontal leg 98. The crank member 94 has an intermediate pivot portion 106 at the intersection of the vertical and horizontal legs 96 and 98 spaced above the pedal attachment shaft 72. The crank member 94 is pivotally connected at its intermediate pivot portion 106 to a rudder crank support shaft 108 coupled to the frame 38 so as to allow the crank member 94 to pivot relative to the frame 38 about the crank support shaft 108.

Figure 11:
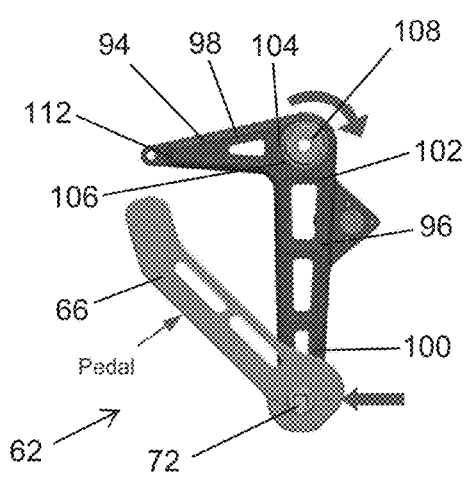
FIGS. 11 and 12 are partial side elevation views of components of the rudder control assembly shown removed from the assembly of FIG. 10 for illustration purposes.
Figure 12:
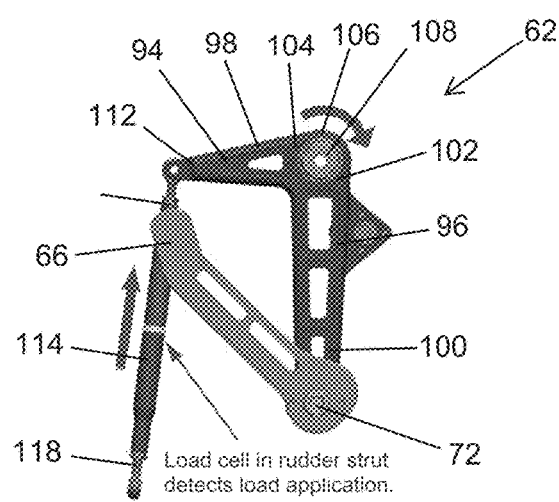

The crank support shaft 108 is oriented with its longitudinal axis 110 substantially parallel to the longitudinal axis 74 of the pedal attachment shaft 72. Accordingly, forward and aft movement of the foot pedal's heel portion 70 causes the lower end 100 of the crank member's vertical leg 96 to move forward or aft relative to the frame 38. As shown in FIGS. 11 and 12, this movement causes the crank member 94 to pivot at its intermediate pivot portion 106 about the crank support shaft 108, causing the forward end 112 of the horizontal leg 98 to move up or down relative to the frame 38. A rudder strut 114 is pivotally attached at its upper end to the forward end 112 of the crank's horizontal leg 98. The rudder strut's lower end 118 is securely connected to a pedal interconnection assembly 120 that operatively interconnects the inboard and outboard pedal assemblies 44 and 46.

As shown in FIG. 10, the pedal interconnection assembly 120 has a rudder control shaft 122 rotatably carried by the frame 38 substantially parallel to the frame's base plate 24. An aft end 124 of the rudder control shaft 122 is rotatably attached to the frame's aft portion 50 and the shaft's forward end 126 is rotatably attached to the frame's forward portion 48, such that the longitudinal axis of the rudder control shaft 122 is substantially aligned with the centerline of the frame and is perpendicular to the pedal attachment shaft 72. The rudder control shaft 122 carries a crank fitting 128, such that the rudder control shaft and the crank fitting are rotatable as a unit relative to the frame 38.

Figures 13, 14:
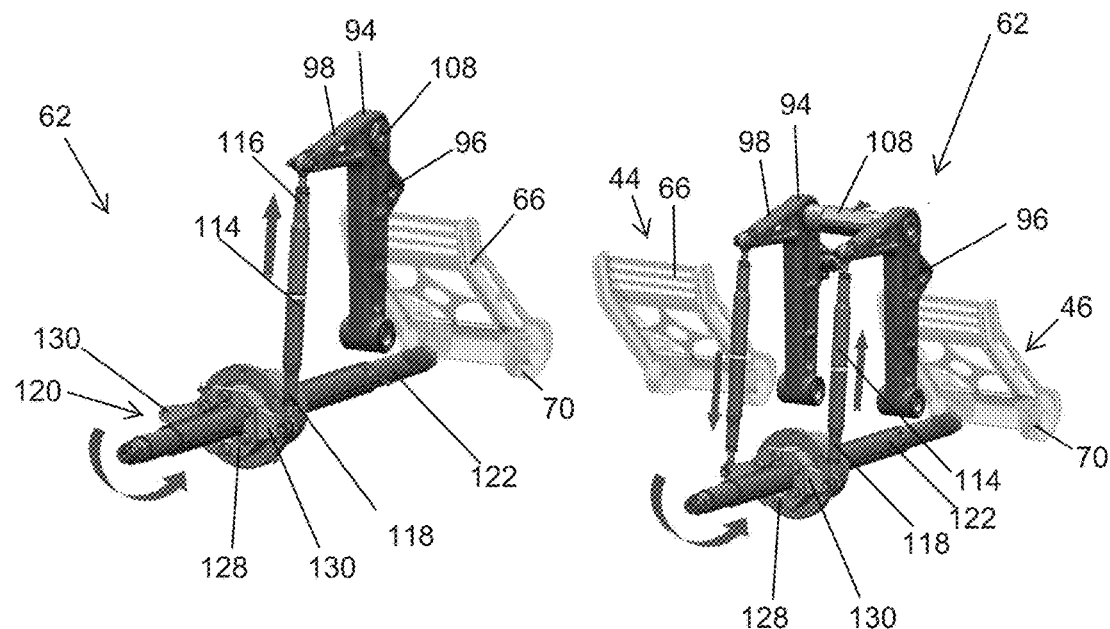
FIGS. 13 and 14 are partial isometric views showing components of the rudder control assembly removed from the assembly of FIG. 10 for illustration purposes.

As shown in FIGS. 13 and 14, the crank fitting 128 has an opposing pair of free end portions 130 spaced apart from the rudder control shaft 122. Each free end portion 130 is attached to a lower end 118 of a respective one of the rudder struts 114. Accordingly, the rudder struts 114 interconnect the rudder control shaft 122 to the L-shaped crank members 94 and their associated foot pedals 66 for movement in equal and opposite directions relative to the rudder control shaft 122. For example, when a pilot presses one foot pedal 66 in a forward direction relative to the frame 38 (FIG. 10), the associated crank member 94 pivots about the crank support shaft 108, thereby lifting the horizontal leg 98 and its associated rudder strut 114, which pulls upwardly on the corresponding free end portion 130 of the crank fitting 128 and rotates the rudder control shaft 122 about its longitudinal axis. This rotation of the rudder control shaft 122 in the counterclockwise direction, as shown in FIGS. 13 and 14, pulls the other free end portion 130 of the crank fitting 128 downwardly, thereby pulling the attached rudder strut 114 and crank member's horizontal leg 98 downwardly, which pivots the crank member 94, and pushes the other foot pedal 66 in the aft direction relative to the frame 38 (FIG. 10). Accordingly, the inboard and outboard pedal assemblies 44 and 46 are interconnected to move in equal and opposite directions when a pilot pushes against the heel portion 70 of a foot pedal 66. Biasing members, such as one or more torsion springs concentric with the rudder control shaft 122, can be used to provide torque to continually oppose the rudder motion and return the pedals 66 to a neutral position, thereby providing selected tactile feedback to the pilot.

Figure 15:
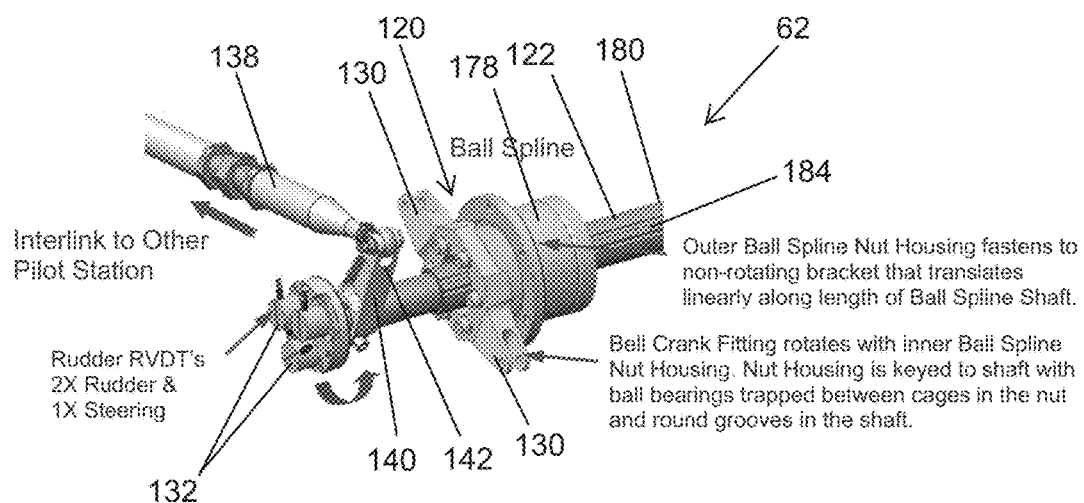
FIG. 15 is an enlarged isometric view of a portion of the rudder control assembly shown removed from the assembly of FIG. 10 for illustration purposes.

The rudder control shaft 122 is coupled to one or more rotary movement detection members 132, shown in FIG. 15. The rotary detection members 132 are configured to detect the rotary motion of the rudder control shaft about its longitudinal axis in response to pilot input via the pedal assemblies 44 and 46 (FIG. 10), or in response to input from an autopilot system. In the illustrated embodiment, the rotary movement detection members 132 include a plurality of Rotary Variable Differential Transformers ("RVDT"s) mounted to the forward end of the rudder control shaft 122 and operatively coupled to one or more of the electrical connectors 28 on the forward portion of the frame 38 (FIG.

10). The RVDTs provide one or more signals, such as variable angle displacement data related to the control shaft as a function of the pilot input via the foot pedals 66. These signals are provided via the electrical connectors 28 to the aircraft's rudder control system manipulation and control of the rudder 14 (FIG. 1). Accordingly, the rudder control assembly 62 can be quickly and easily connected, via the electrical connectors 28, to the aircraft's fly-by-wire flight control system to control movement of the aircraft's rudder 14 (FIG. 1), without having to pass through the flight deck.

Figure 16:
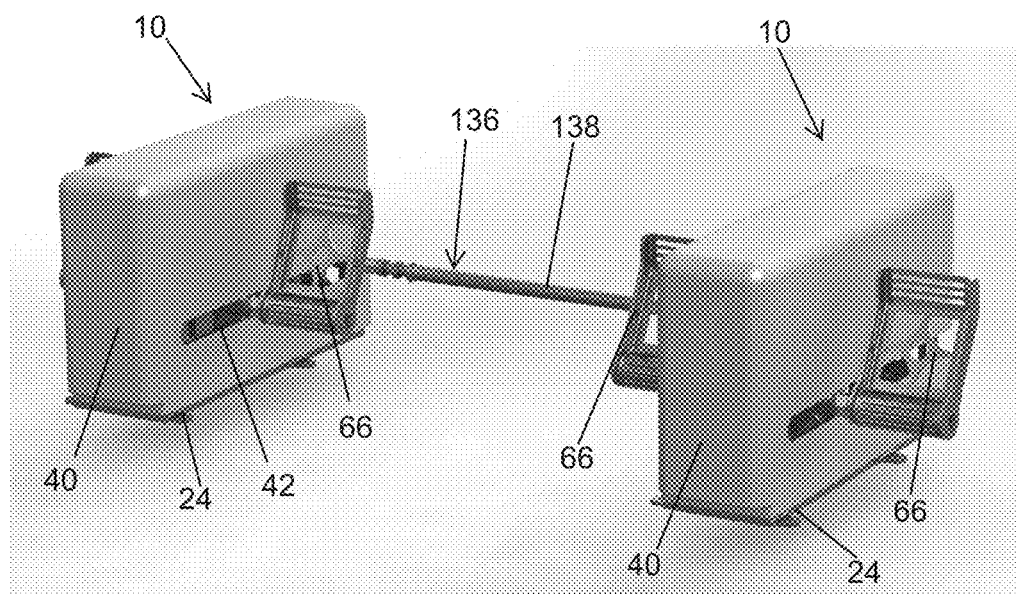
FIG. 16 is an isometric view of a pair of modular brake and rudder control assemblies in accordance with the present disclosure interconnected by an interlink rod for simultaneous and identical operation of each unit.
Figure 17:
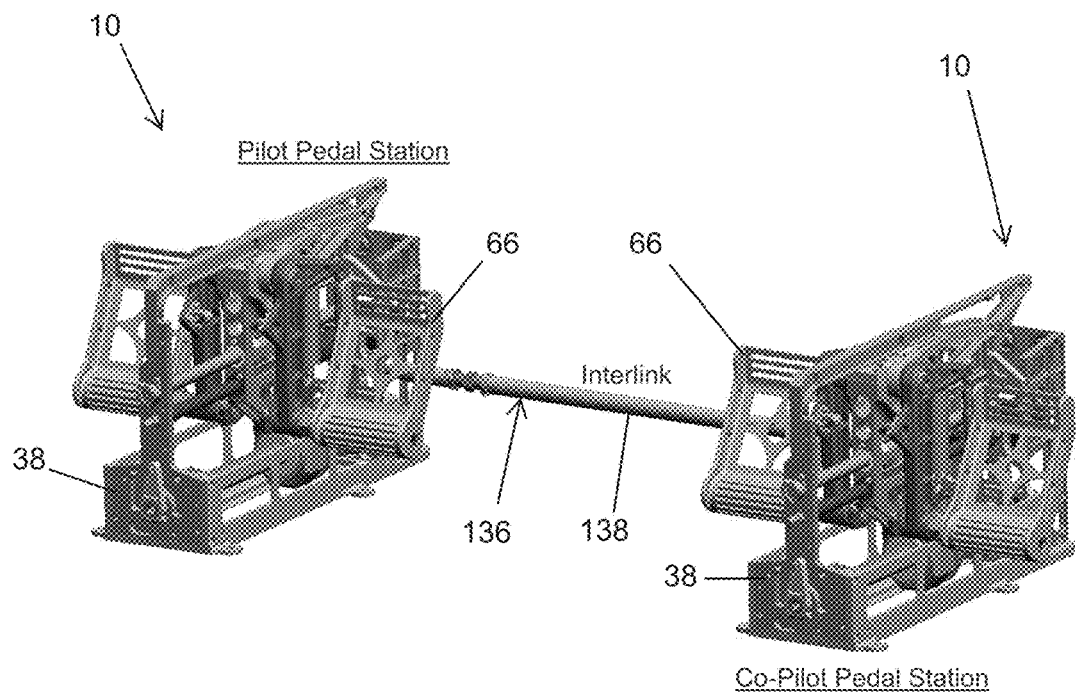
FIG. 17 is an isometric view of the pair of brake and rudder control units of FIG. 16 and with the covers not shown for illustration purposes.
Figure 18:
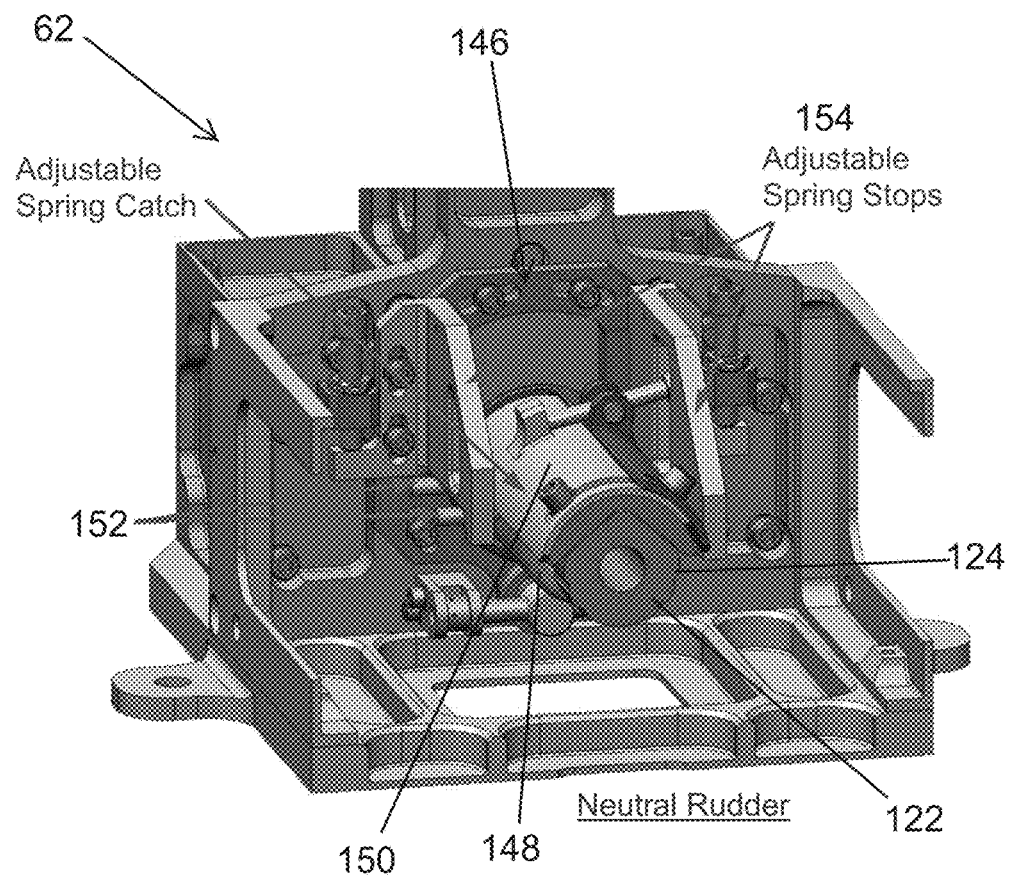
FIG. 18 is an enlarged isometric view of a rudder return assembly of the rudder control assembly of FIG. 4, the rudder return system shown in a "neutral rudder" position.
Figures 19, 20:
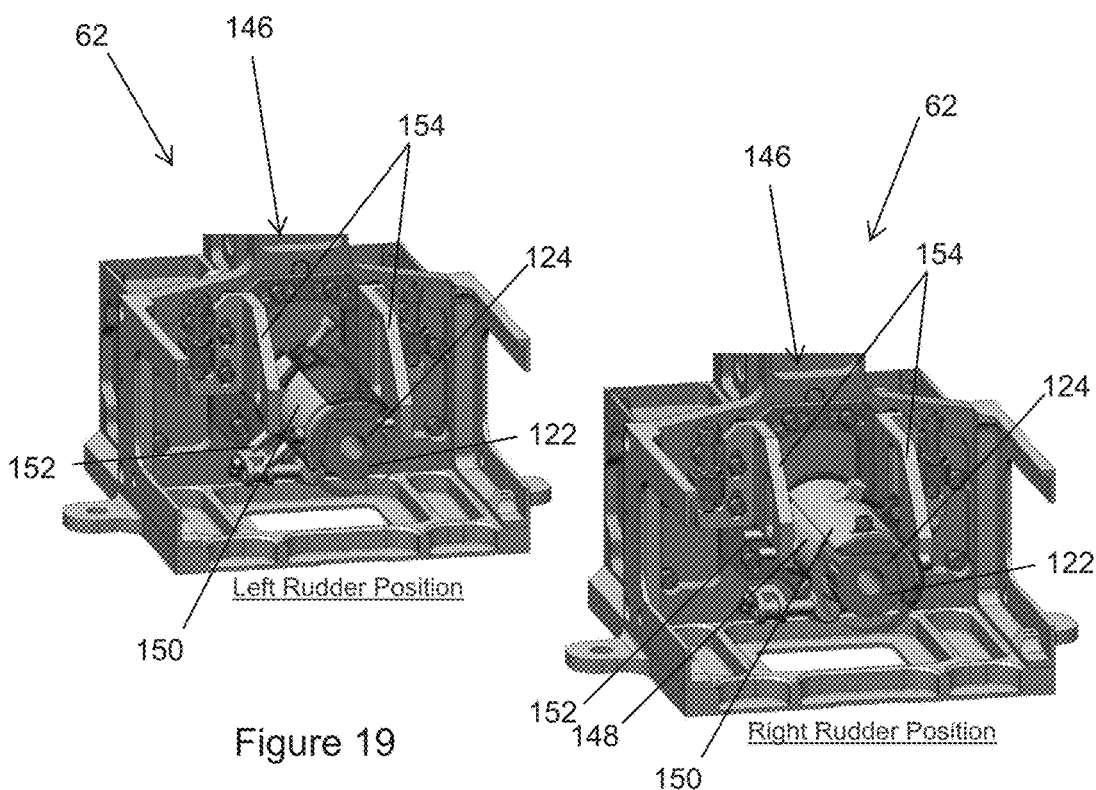
FIG. 19 is an enlarged isometric view of the rudder return assembly of FIG. 18 shown in a "left rudder" position.
FIG. 20 is an enlarged isometric view of the rudder return assembly of FIG. 18 shown in a "right rudder" position.

As best seen in FIGS. 15 and 16, at least one embodiment of the rudder control assembly 62 includes a station interlink assembly 136 that operatively interconnects the rudder control assemblies 62 of adjacent modular brake and rudder control assemblies 10, such as at the captain and first officer stations in the aircraft. The station interlink assembly 136 includes an adjustable interlink shaft 138 that mechanically interconnects and identically conveys rudder control input from the assembly in one pilot station to the assembly in other pilot station.

In the illustrated embodiment, the interlink shaft 138 is substantially perpendicular to the rudder control shaft 122 (FIG. 15). Each end of the interlink shaft 138 is operatively connected to an interlink flange 140 (FIG. 15) fixedly attached to the forward end portion of the rudder control shaft 122. The interlink flange 140 rotates with the rudder control shaft 122 as a unit, such that a free end 142 of the interlink flange 140 spaced away from the rudder control shaft 122 moves along an arcuate path as the rudder control shaft 122 rotates about its longitudinal axis. The free end 142 of the interlink flange 140 is pivotally connected to the end of the interlink shaft 138. Accordingly, rotation of the rudder control shaft 122 and the interlink flange 140 drives the interlink shaft 138, laterally in the left or right direction, depending upon the direction of rotation of the rudder control shaft. This lateral movement of the interlink shaft 138 creates equal rotation of the rudder control shafts 122 of the two modular assemblies 10 to which the ends of the interlink shaft are attached. Accordingly, a pilot's rudder control input at one pilot station will be substantially identically mirrored at the other pilot station via the station interlink assembly 136.

As seen in FIGS. 10 and 18-20, the rudder control assembly 62 has a rudder centering assembly 146 connected to the aft end portion 124 of the rudder control shaft 122. The rudder centering assembly 146 provides biasing forces that urge the rudder control assembly 62 to a neutral, "no-rudder" position. The rudder centering assembly 146 of the illustrated embodiment has a pair of redundant torsion springs 148 or other rotation biasing members connected to the rudder control shaft 122. Each torsion spring 148 is secured on the rudder control shaft 122 with a spring catch member 150 that captures the torsion springs while allowing the rudder control shaft 122 to rotate relative to the frame 38.

Each spring 148 has inboard and outboard engagement tangs 152 projecting away from the rudder control shaft 122. Adjustable inboard and outboard spring stops 154 are mounted to the frame's aft portion 50 adjacent to the torsion springs 148. Each adjustable spring stop 154 is positioned to block the respective inboard or outboard spring tangs 152 from moving past the stop as the rudder control shaft 122 rotates away from the neutral or "no rudder" position. Accordingly, the torsion springs 148 provide torsional resistance to rotation of the rudder control shaft 122 away from the neutral position and, upon rotation, urge of the shaft to return to the neutral position. In the illustrated embodiment, the redundant torsion springs 148 are configured to provide a torque of approximately 184 inch-pounds, which is equivalent to approximately 40 pounds of feel to the pilot at the foot pedals 66 during full rudder stroke in either direction. In one embodiment, the rudder centering assembly 146 can be mounted to an adjustable bracket configured to allow adjustment of the spring stops 154 and to allow adjustment of the neutral position relative to a selected neutral rating when the brake and rudder control assembly 10 is installed in the aircraft.

In one embodiment, the brake and rudder control assembly 10 can include an adjustment lever fixed to the aft end portion 124 of the rudder control shaft 122. The adjustment lever has an aperture that aligns with an aperture in the frame's aft portion 50 when the rudder is in the neutral position. The aligned apertures are configured to receive a rigging pin or the like, such that the rigging pin blocks the rudder control shaft from rotating, thereby effectively holding the aircraft's rudder in the neutral position. Additional alignable apertures in the adjustment lever and the frame's aft portion can be provided to receive the rigging pin and hold the aircraft's rudder in full left rudder or right rudder positions or other selected intermediate positions.

The Pedal Adjustment System

The brake and rudder control system's pedal adjustment assembly 64 is operatively independent of the brake control assembly 60 and the rudder control assembly 62 discussed above. The pedal adjustment assembly 64 allows for positional adjustment of the foot pedals 66. The extent of adjustment can be selected based on ergonomics and human factors data for pilots of different sizes. In the illustrated embodiment, the pedal adjustment assembly 64 allows for angular and longitudinal adjustment of the foot pedals 66 in the forward/aft directions relative to the frame 38 without changing the pedal stroke length and without interfering with the rudder control assembly 62 or the brake control assembly 60.

The pedal adjustment assembly 64 is configured to allow the foot pedals 66 to move between a forward most position (FIG. 22), e.g., for a pilot with long legs, and an aft most position (FIG. 23), e.g., for a pilot with shorter legs. In the illustrated embodiment, the pedal adjustment assembly 64 is configured to provide an adjustment stroke of approximately 9-inches of horizontal travel relative to the frame's base plate 24. The pedal adjustment assembly 64 is also configured to change the angular orientation of the foot pedals 66 through a range of approximately 18° relative to the frame's base plate 24 to accommodate typical foot orientation of taller and shorter pilots while sitting in the aircraft's pilot seat. Other embodiments can provide other adjustment ranges including longer or shorter adjustment strokes and larger or smaller ranges of angular adjustment.

Figure 21:
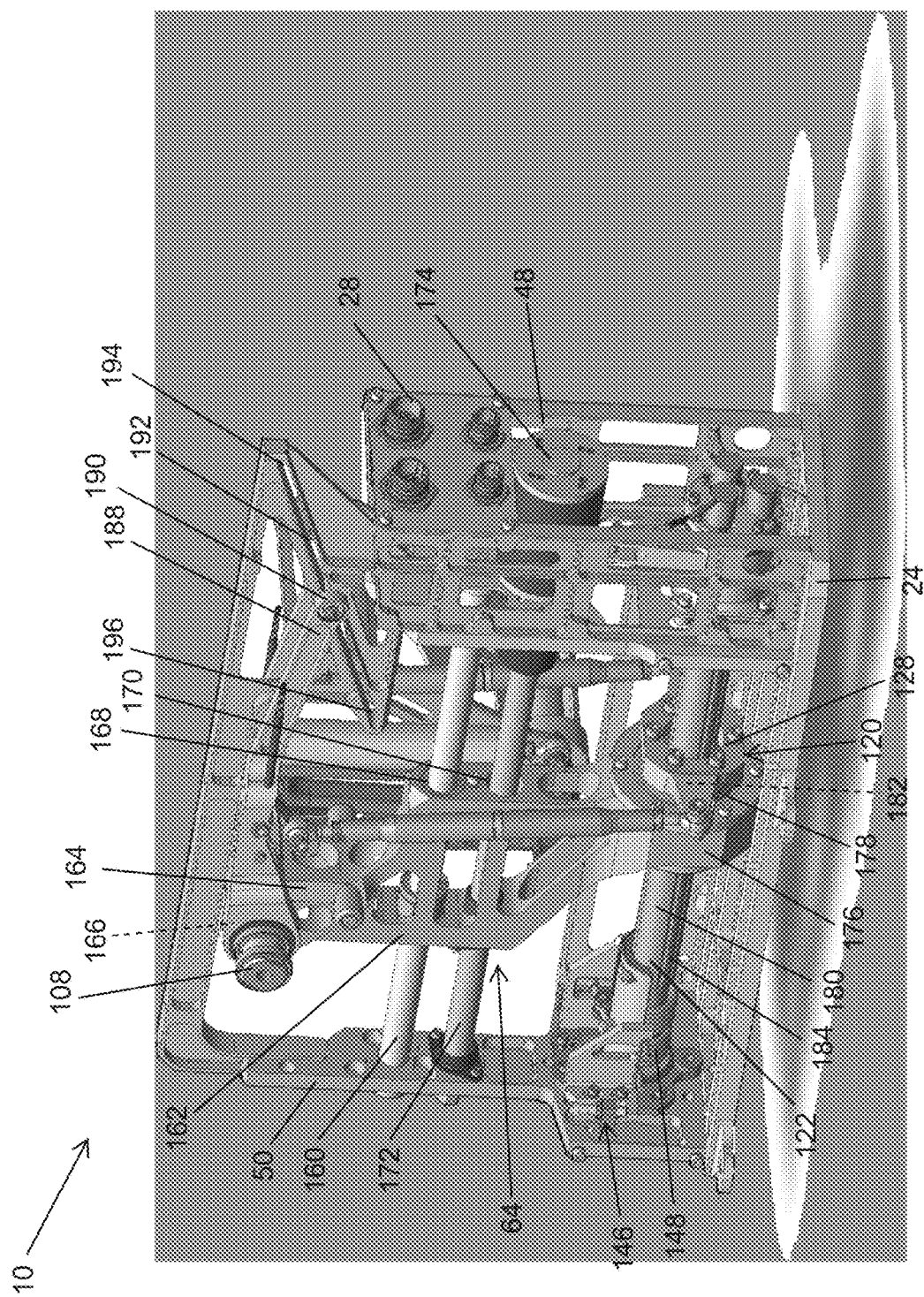
FIG. 21 is a partial isometric view of the brake and rudder control assembly of FIG. 4 with portions of a pedal assembly not shown to avoid obscuring a pedal position adjustment assembly, which is shown in an intermediate position.
Figure 24:
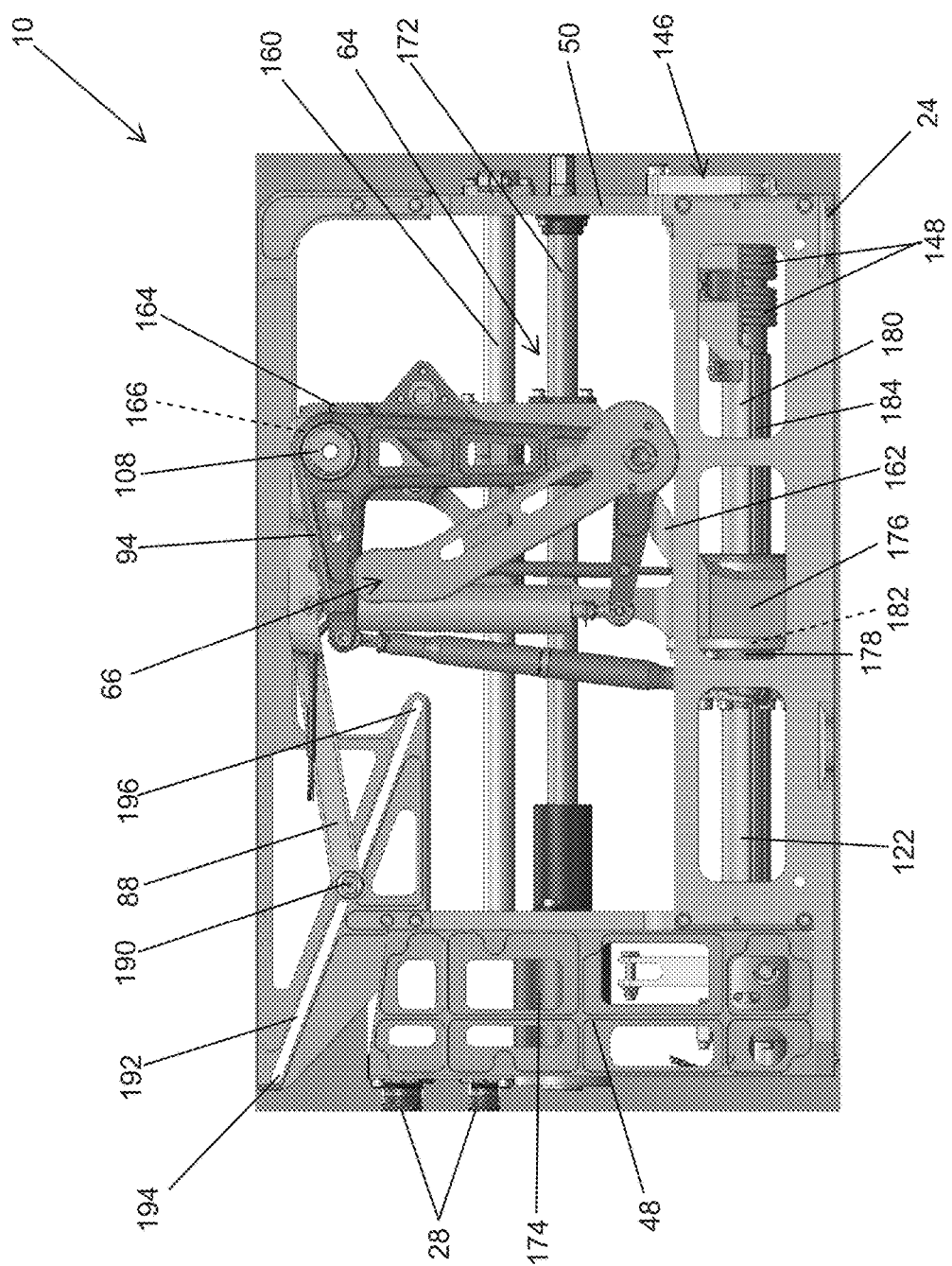
FIG. 24 is a partial side elevation view of the pedal position adjustment assembly of FIG. 21, with the pedal assemblies shown in an intermediate position.

FIG. 24 is a partial side elevation view of the brake and rudder control assembly 10 with the cover and other selected components not shown to avoid obscuring other features of the pedal adjustment assembly 64. As best seen in FIGS. 21 and 24, the pedal adjustment assembly 64 includes an upper guide bar 160 securely fixed at the forward and aft ends to the frame's forward and aft portions 48 and 50. The guide bar 160 is substantially parallel to the frame's base plate 24 and is aligned with the frame's centerline. The guide bar 160 extends through a translatable central guide structure 162 configured to slidably move over the guide bar 160 between forward and aft adjustment positions relative to the frame 38. The central guide structure 162 is also disposed between the two crank members 94 and in alignment with the frame's centerline.

The central guide structure 162 has an upper portion 164 with an aperture 166 therethrough that carries the crank support shaft 108 that connects to the inverted L-shaped crank members 94. Accordingly, the central guide structure 162 moves with the inboard and outboard pedal assemblies 44 and 46 as a unit between the forward and aft adjustment positions. The central guide structure 164 also has sets of upper and lower longitudinally aligned apertures 168 and 170 (FIG. 21). The upper guide bar 160 is slidably disposed in the set of upper apertures 168. A horizontal drive shaft 172 is positioned below and vertically aligned with the upper guide bar 160. The drive shaft 172 extends through the set of lower apertures 170 in the central guide structure 162 and is rotationally supported at its forward and aft ends by the frame 38.

In the illustrated embodiment, the drive shaft 172 is a threaded drive shaft, and at least one of the lower apertures 170 of the central guide support 162 includes mating internal threads that operatively engages threads on the drive shaft 172. A drive motor 174 is connected to a forward end portion of the drive shaft 172 and is activatable to rotate the drive shaft 172 about its longitudinal axis. When the drive motor 174 rotates the drive shaft 172, the threaded engagement between the drive shaft and the central support structure 162 causes the central support structure to move forward or aft along the drive shaft 172 and along the upper guide bar 160. This translation of the central support structure 162 simultaneously moves the pedal assemblies 44 and 46 in the forward or aft directions relative to the frame 38. The threaded drive shaft 172 can be manually rotatable for manual adjustment of the pedal positions relative to the frame 38. Although the illustrated embodiment uses a drive motor and threaded drive shaft to adjust the pedal assemblies, other embodiments can use other drive mechanisms to translate the pedal assemblies horizontally along its adjustment stroke.

The central guide structure 162 is also fixedly connected at its lower portion 176 to a ball spline nut 178 carried by the rudder control shaft 122. The ball spline nut 178 is also securely connected to the crank fitting 128 (FIG. 21) of the pedal interconnection assembly 120. In the illustrated embodiment, the crank fitting 128 is a bell crank fitting fixed to the ball spline nut 178 so as to move axially and rotationally as a unit with the ball spline nut 178. The ball spline nut 178 is slidably disposed on a ball spline shaft portion 180 of the rudder control shaft 122. The ball spline nut 178 has a central aperture 182 with one or more internal grooves that slideably mate with elongated splines 184 on the outer diameter of the ball spline shaft portion 180. Accordingly, this spline interface causes the ball spline nut 178, the crank fitting 128 and the rudder control shaft 122 (via the ball spline shaft portion 180) to rotate as a unit about the shaft's longitudinal axis when one foot pedal 66 moves forwardly and the other foot pedal 66 moves aft to adjust rudder position. The ball spline nut 178 is also axially translatable along the ball spline shaft portion 180 as the threaded drive shaft 172 rotates and adjusts the forward/aft position of the pedal assemblies 44 and 46 along their horizontal adjustment stroke, without impacting the operation of the rudder control assembly 62 or the brake control assembly 60.

Figure 22:
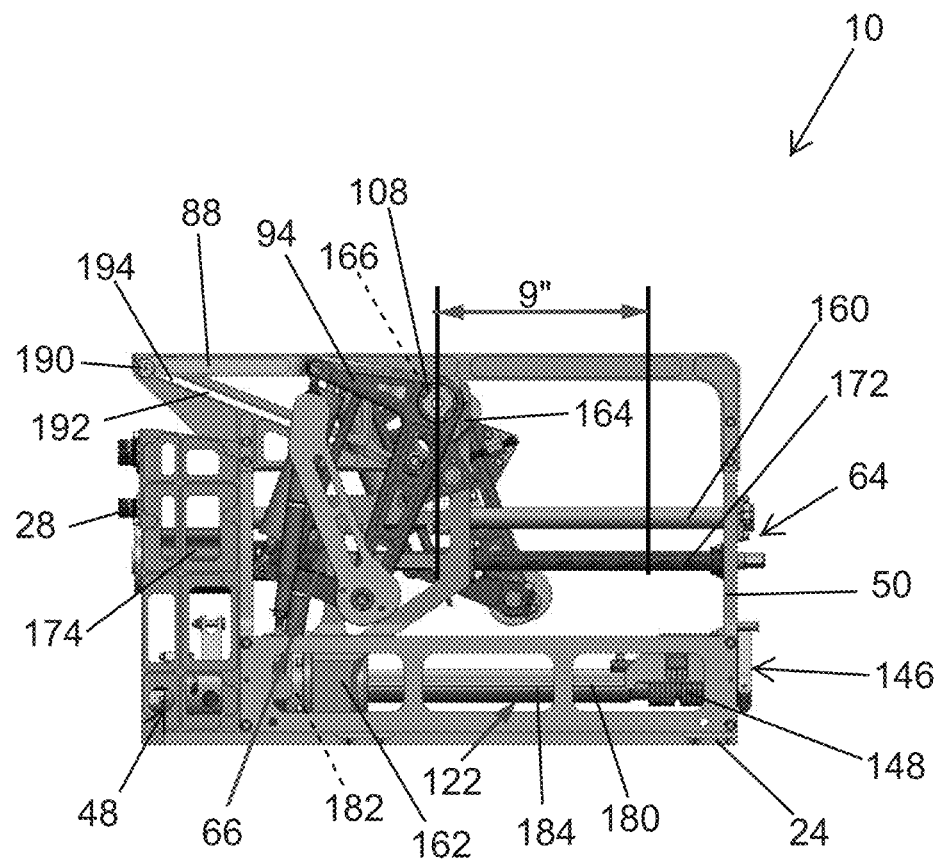
FIG. 22 is a side elevation view of the pedal position adjustment assembly of FIG. 21, with the pedal assemblies shown in a forward-most position.
Figure 23:
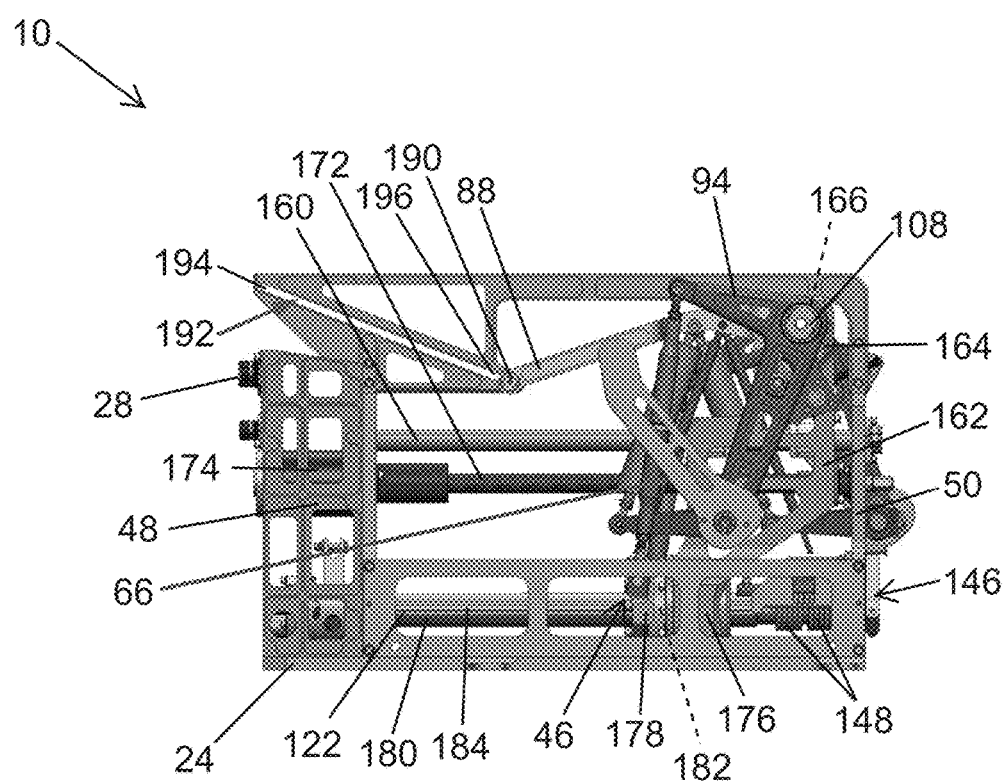
FIG. 23 is a side elevation view of the pedal position adjustment assembly of FIG. 21, with the pedal assemblies shown in an aft-most position.

The pedal adjustment assembly 64 is also configured to modify the angular orientation of each foot pedal 66 as the pedal assemblies are translated in the forward or aft direction along the adjustment stroke. As best seen in FIGS. 22-24, the upper linkage members 88, discussed above in connection with the brake control assembly 60, are coupled to the top of each pedal assembly 44 and 46 and is positioned adjacent to the frame's upper member 56. In the illustrated embodiment, the upper linkage members 88 for each of the inboard and outboard pedal assemblies 44 and 46 are integrally connected to each other. In other embodiments, the upper linkage members 88 for each of the pedal assemblies 44 and 46 may be independent, non-integrally connected to each other. The aft end of each linkage member 88 is pivotally attached to the crank support shaft 108 adjacent to the crank members 94. The upper linkage member 88 has a forward end portion 188 connected to a cam follower 190 that is slidably disposed in a cam slot 192 formed in the forward portion of the frame's upper member 56.

The cam slot 192 in the frame's upper member 56 is angled downwardly from an upper forward end 194 to a lower aft end 196 of the slot. The cam follower 190 travels along the cam slot 192 as the pedal assemblies 44 and 46 are axially positioned at or between their forward and aft positions. When the pedal assemblies 44 and 46 are in their forward-most position, the cam follower 190 is positioned at the cam slot's upper forward end 194. As the pedal assemblies 44 and 46 are adjusted in the aft direction, upon rotation of the threaded drive shaft 172, the cam follower 190 follows the downward slope of the cam slot 192. When the pedal assemblies 44 and 46 are in the aft-most position of the adjustment stroke, the cam follower 190 is positioned at the lower aft end 196 of the cam slot 192.

As the pedal assemblies 44 and 46 are moved along the adjustment stroke from the aft-most position forwardly toward the forward-most position, each foot pedal 66 pivots away from the horizontal plane and closer to the vertical plane, thereby changing the angular orientation of the foot pedal for engagement by the pilot's foot. In the illustrated embodiment, when the pedal assemblies 44 and 46 are in their aft-most position and the cam follower 190 is at the lower aft end 196 of the cam slot 192, the pedal angle is at approximately 37°-39° incline relative to the vertical plane. As the pedal assemblies 44 and 46 move forwardly along the adjustment stroke, the angular orientation of the foot pedals 66 increases through a range of approximately 18° until the pedal assemblies are oriented at approximately 21° relative to the vertical plane when pedal assemblies are in their forward most position with the cam follower 190 at the upper forward end 194 of the cam slot 192.

The angular orientation of the foot pedals 66 is configured to provide improved comfort and fit for the pilot while sitting in the pilot seat in the cockpit of the aircraft. Other embodiments may provide a different range of angular adjustment of the foot pedals 66, or provide different angular orientations of the foot pedals at either end of the adjustment stroke. For example, one or more other embodiments may provide different angular orientations of the pedal assemblies by providing the cam slot with a different angle relative to the horizontal plane. A cam slot oriented at a greater angle may provide an increased range of angular pedal adjustment. A shallower angle may provide less angular change of the foot pedals as they moved between the forward-most and aft-most positions.

As seen in FIG. 24, the upper linkage member 88 cooperates with the brake system's LVDT 84 and/or the brake system's stop rod 90, the brake lever 80, and the vertical leg 96 of the crank member 94 to provide a four-bar linkage arrangement for each pedal assembly. This four-bar linkage arrangement provides a coherent, rigged, "no-brake" position independent of the adjusted pedal position and the rudder position. Accordingly, in the "no-brake" position, the LVDT 84 opposes and is the same length as the crank member's vertical leg 96, such that the four-bar linkage allows the pedal assemblies 44 and 46 to move to any position along the adjustment stroke without inadvertently applying or activating the brakes. Operation and performance of the brake control assembly 60 and the rudder control assembly 62 remains independent of the pedal assemblies' position along the adjustment stroke.

These three independent control systems within the one modular brake and rudder control unit provides a compact, highly versatile unit that can be easily and quickly secured to the top surface of the flight deck without having to penetrate through the flight deck for interconnection with other systems within the aircraft. The electrical connectors at the forward end portion of the modular unit allows for quick and easy interconnection or disconnection with the aircraft's other brake, steering, and rudder position systems via the fly-by-wire interface. The modular design also allows for quick and easy installation, maintenance, and/or replacement, such as during original manufacturer, retrofit, or while the aircraft is in the field.

From the foregoing, it will be appreciated that specific embodiments of the invention have been described herein for purposes of illustration, but that various modifications may be made without deviating from the invention. Additionally, aspects of the invention described in the context of particular embodiments or examples may be combined or eliminated in other embodiments. Although advantages associated with certain embodiments of the invention have been described in the context of those embodiments, other embodiments may also exhibit such advantages. Additionally, not all embodiments need necessarily exhibit such advantages to fall within the scope of the invention. Accordingly, the invention is not limited except as by the appended claims.

We claim:

1. A modular brake and rudder control system for use in an aircraft having a cockpit with a flight deck floor, and having a brake system and a rudder system, the modular brake and rudder control system comprising:

A housing with opposing side portions, the housing having a frame and a cover substantially enclosing the frame, the frame having forward and aft portions, a longitudinal axis extending between the forward and aft portions, and a base extending between the forward and aft portions, the base being configured to mount fully above the flight deck floor, the housing having a guide member extending between the forward and aft portions;

Electrical connectors connected to the housing and operatively connectable to the brake and rudder systems;

A pair of pedal assemblies coupled to the frame and having mounting members projecting from the side portions on opposing sides of the cover, each pedal assembly having a foot pedal coupled to the mounting members and being exterior of the cover and adjacent to respective side portions of the cover and engageable by an operator, each pedal assembly being independently rotatable and being connected to a guide structure movably connected to the guide member, the pedal assemblies and guide structure being movable as a unit between forward and aft pedal positions relative to the housing;

A brake control system in the housing and connected to the pedal assemblies, the brake control system having a first movement sensor operatively coupled to at least a first one of the pedal assemblies and connected to at least a first one of the electrical connectors, the first movement sensor configured to detect rotational movement of the pedal assembly and to provide a first signal through the first electrical connector to the brake system for actuation of the brake system;

A rudder control system in the housing and being operably independent of the brake control system, the rudder control system having a rotatable rudder control shaft and having a control fitting longitudinally movable along the rudder control shaft and rotatable with the rudder control shaft, the control fitting being coupled to the guide structure and longitudinally movable with the pedal assemblies relative to the guide member between the forward and aft pedal positions, the rudder control system having a second movement sensor operatively coupled to the pedal assemblies and connected to a second one of the electrical connectors that connects to the rudder system, the second movement sensor configured to detect longitudinal motion of the foot pedals and configured to provide a second signal through the second electrical connector to the rudder system; and A position adjustment system operably connected to the pedal assemblies and to the guide structure and being adjustable as the guide structure moves along with the guide member to simultaneously move the pedal assemblies in the same direction to change a longitudinal position of the pedal assemblies relative to the frame on the opposing sides of the cover between the forward and aft positions without changing a vertical position of the mounting members of the foot pedals and the respective axis of rotation.

2. The modular brake and rudder control system of claim 1 wherein the base is a base plate mountable atop the flight deck floor.

3. The modular brake and rudder control system of claim 1 wherein the housing, the pedal assemblies, the brake control system, the rudder control system, and the position control system define a modular unit removably mountable atop the flight deck floor.

4. The modular brake and rudder control system of claim 3, wherein the cockpit has first and second pilot stations, and wherein the modular unit is configured to be interchangeably positionable in the first and second pilot stations.

5. The modular brake and rudder control system of claim 1, wherein the pedal assemblies are first pedal assemblies and the rudder control system is a first rudder control system, and further comprising an interlink connected to the first rudder control system, the interlink being connectable to a second rudder control system of an adjacent second modular brake and rudder control system, wherein the interlink transfers longitudinal movement of the pedal assemblies of the first rudder control system to longitudinal movement of second pedal assemblies and the second rudder control system of the second modular brake and rudder control system.

6. The modular brake and rudder control system of claim 1 wherein the cover has opposing sidewalls located between the foot pedals and having elongated slots therein, wherein the mounting members extend through the slots and are longitudinally movable through the slots.

7. The modular brake and rudder control system of claim 1 wherein the brake control system includes a brake lever that interconnects the first movement sensor and the first one of the pedal assemblies, the brake lever and the first one of the pedal assemblies being rotatable as a unit relative to the housing, wherein the brake lever translates movement of the first one of the pedal assemblies to the first movement sensor.

8. The modular brake and rudder control system of claim 7 wherein the first movement sensor is a linear movement detection member configured to detect a range and rate of motion of the brake lever upon rotation of the first one of the pedal assemblies and to generate a brake control signal as a function of the range and rate of movement of the brake lever.

9. The modular brake and rudder control system of claim 1 wherein the rudder control system rotationally interconnects the pedal assemblies, wherein rotation of the rudder control shaft corresponds to longitudinal movement of each pedal assembly relative to the housing in equal and opposite directions.

10. The modular brake and rudder control system of claim 9 wherein the second movement sensor is a rotary movement detection member coupled to the rudder control shaft and configured to detect rotational motion of the rudder control shaft upon longitudinal movement of the pedal assemblies and to generate the rudder control signal as a function of the longitudinal movement of the pedal assemblies.

11. A modular brake and rudder control system for use in a vehicle having a control center with a control deck floor, and having an electronically controlled brake system and an electronically controlled rudder system, the modular brake and rudder control system comprising:

A housing comprising a cover enclosing an internal frame with a base portion that mounts in the control center fully above the control deck floor, the frame having forward and aft portions and a longitudinal axis extending therebetween, a guide rod being coupled to the forward and aft portions;

Electrical connectors connected to the housing and operatively connectable to the brake and rudder systems;

A pair of pedal assemblies movably coupled to the guide rod and being longitudinally movable relative to the housing between forward and aft positions, the pedal assemblies each having a foot pedal exterior of and adjacent to opposing sides of the cover and a mounting member attached to the foot pedal and extending at least partially past the cover, each foot pedal being engageable by an operator, each pedal assembly being independently rotatable and longitudinally movable relative to the housing;

A brake control system in the housing and connected to the pedal assemblies, the brake control system having a first movement sensor operatively coupled to at least a first one of the pedal assemblies and connected to at least a first one of the electrical connectors that connects to the brake system, the first sensor configured to provide a first signal through the first electrical connector to the brake system for actuation of the brake system; and A rudder control system in the housing and having a rotatable rudder control shaft extending between the forward and aft portions of the frame, the rudder control system having a control fitting longitudinally movable along the rudder control shaft and rotatable with the rudder control shaft, the control fitting being coupled to the guide structure and longitudinally movable with the pedal assemblies relative to the guide member between the forward and aft pedal positions, the rudder control system configured to detect rotational movement of the rudder control shaft caused by equal and opposite longitudinal motion of the foot pedals and configured to provide a second signal to the rudder system.

12. The modular brake and rudder control system of claim 11, further comprising a position adjustment system operable independent of the brake control system and the rudder control system, the position adjustment system being connected to the pedal assemblies and the guide structure and being adjustable as the guide structure moves along the guide member to simultaneously move the pedal assemblies in the same direction to change a longitudinal position of the pedal assemblies relative to the frame of the housing between the forward and aft positions.

13. The modular brake and rudder control system of claim 11 wherein the guide member and the rudder control shalt are substantially parallel and connected to the front and aft portions of the frame.

14. The modular brake and rudder control system of claim 11 wherein the housing, the pedal assemblies, the brake control system, the rudder control system, and the position control system define a modular unit removably mountable atop the control deck floor.

15. The modular brake and rudder control system of claim 14, wherein the control center has first and second operator stations, and wherein the modular unit is configured to be interchangeably positionable in the first and second operator stations.

16. The modular brake and rudder control system of claim 11 wherein the brake control system includes a brake lever that interconnects the first movement sensor and the first one of the pedal assemblies, the brake lever and the first one of the pedal assemblies being rotatable as a unit relative to the housing, wherein the brake lever translates movement of the first one of the pedal assemblies to the first movement sensor.

17. The modular brake and rudder control system of claim 11 wherein the rudder control shaft is a splined shaft and the control fitting slides axially along the splined shaft, and is rotatable with the splined shaft as a unit, wherein rotation of the rudder control shaft corresponds to longitudinal movement of each foot pedal relative to the housing in the equal and opposite directions.

18. A modular brake and rudder control system for use in an aircraft having a cockpit with a flight deck floor, and having fly-by-wire brake system and a fly-by-wire rudder system, the modular brake and rudder control system comprising:

A housing comprising a frame and a cover over the frame, the frame has a base portion removably attachable atop the control deck floor without penetrating through the floor when the modular brake and rudder control system is operatively connected to the brake and rudder systems, the housing having a guide member;

Electrical connectors connected to the housing and operatively connectable to the brake and rudder systems;

A pair of pedal assemblies coupled to the housing, connected to a guide structure movably connected to the guide member, the pedal assemblies and the guide structure being movable as a unit between forward and aft pedal positions relative to the housing, each pedal assembly being rotatable and longitudinally moveable relative to the housing, wherein the pedal assemblies each have a foot pedal and a mounting member, wherein the mounting members project from opposing side portions of the housing with the cover located between the foot pedals;

A brake control system in the housing and connected to the pedal assemblies, the brake control system provides a first signal to the brake system for actuation of the brake system; and A rudder control system in the housing and carried by the frame, the rudder control system is connected to the pedal assemblies and is operable independent of the brake control system, the rudder control system having a rotatable rudder control shaft and having a control fitting longitudinally movable along the rudder control shaft and rotatable with the rudder control shaft, the control fitting being coupled to the guide structure and longitudinally movable with the pedal assemblies relative to the guide member between the forward and aft pedal positions, the rudder control system is connected to at least a first one of the electrical connectors that connects to the rudder system, the rudder control system detects longitudinal motion of the pedal assemblies and provides a second signal through the first one of the electrical connectors to the rudder system;

Wherein the housing, the electrical connectors, the pedal assemblies, the brake control system and the rudder control system define a modular component installable and removable from the cockpit as a unit.

19. The modular brake and rudder control system of claim 18, further comprising a position adjustment system operable independent of the brake control system and the rudder control system, the position adjustment system being connected to the pedal assemblies and being adjustable to simultaneously move the pedal assemblies in the same direction to change a longitudinal position of the pedal assemblies relative to the housing.

20. The modular brake and rudder control system of claim 19, further comprising an interlink connected to the rudder control system, the interlink being connectable to a second rudder control system of an adjacent second modular brake and rudder control system, wherein the interlink transfers longitudinal movement of the pedal assemblies to longitudinal movement of second pedal assemblies and the second rudder control system of the second modular brake and rudder control system.

21. The modular brake and rudder control system of claim 11, wherein the rudder control system is fully contained in the housing and is operably independent of the brake control system, the rudder control system has a second movement sensor operatively coupled to the pedal assemblies and connected to a second one of the electrical connectors that connects to the rudder system, the second movement sensor configured to detect longitudinal motion of the pedal assemblies and to provide a second signal through the second electrical connector to the rudder system as a function of longitudinal movement of the pedal assembly.

22. The modular brake and rudder control system of claim 18, wherein the brake control system is connected to at least a second one of the electrical connectors that connects to the brake system, the brake control system detects rotational movement of the pedal assembly and provides the first signal through the second electrical connector to the brake system.

* * * * *